US007174977B2

(12) United States Patent
Enjoji et al.

(10) Patent No.: US 7,174,977 B2
(45) Date of Patent: Feb. 13, 2007

(54) VEHICLE WITH ELECTRIC MOTOR MOUNTED THEREON

(75) Inventors: Naoyuki Enjoji, Utsunomiya (JP);
Masaharu Suzuki, Utsunomiya (JP);
Hideaki Kikuchi, Kawachi-gun (JP);
Yoshinori Wariishi, Utsunomiya (JP);
Masaru Oda, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 10/358,679

(22) Filed: Feb. 5, 2003

(65) Prior Publication Data

US 2003/0146026 A1 Aug. 7, 2003

(30) Foreign Application Priority Data

Feb. 5, 2002 (JP) ............................. 2002-028366

(51) Int. Cl.
*B60K 1/02* (2006.01)
(52) U.S. Cl. .................. 180/65.1; 180/65.3; 180/53.8; 477/5
(58) Field of Classification Search ............... 180/65.1, 180/65.2, 65.3, 65.4, 65.6, 65.7, 65.8, 69.6, 180/53.8, 53.5; 290/1 A; 477/3, 5; 475/5, 475/509, 491
See application file for complete search history.

(56) References Cited

U.S. PATENT DOCUMENTS

| | | | | |
|---|---|---|---|---|
| 3,826,096 A | * | 7/1974 | Hrusch | .................. 60/709 |
| 4,481,424 A | * | 11/1984 | Hattori et al. | ............ 290/38 R |
| 5,509,491 A | * | 4/1996 | Hall, III | .................... 180/9.44 |
| 5,588,325 A | * | 12/1996 | Green et al. | ............... 74/15.63 |
| 5,635,805 A | | 6/1997 | Ibaraki et al. | |
| 5,755,303 A | * | 5/1998 | Yamamoto et al. | ........ 180/65.2 |
| 5,760,488 A | | 6/1998 | Sonntag | |
| 6,223,844 B1 | * | 5/2001 | Greenhill et al. | .......... 180/65.3 |
| 6,233,508 B1 | * | 5/2001 | Deguchi et al. | ............. 701/22 |
| 6,318,487 B2 | * | 11/2001 | Yanase et al. | ............. 180/65.2 |
| 6,484,830 B1 | * | 11/2002 | Gruenwald et al. | ........ 180/65.2 |
| 6,516,905 B1 | * | 2/2003 | Baumert et al. | ........... 180/53.8 |
| 6,520,273 B1 | * | 2/2003 | Ishikawa | .................... 180/65.3 |

(Continued)

FOREIGN PATENT DOCUMENTS

DE 2214412 10/1973

(Continued)

OTHER PUBLICATIONS

German Office Action, Serial No.: 103 00 068.2-45, dated Oct. 10, 2005.

(Continued)

*Primary Examiner*—Jeff Restifo
(74) *Attorney, Agent, or Firm*—Lahive & Cockfield LLP; Anthony A. Laurentano, Esq.

(57) ABSTRACT

A fuel cell system incorporated in a vehicle has a main electric motor, a drive power transmitting mechanism for engaging and disengaging a fuel gas pump, a coolant fluid pump, a supercharger, and a compressor, which serve as auxiliary equipment, and transmitting a drive power to the auxiliary equipment, and an auxiliary electric motor coaxially connectable to the main electric motor for transmitting a drive power to the auxiliary equipment depending on the manner in which the vehicle is operated.

15 Claims, 25 Drawing Sheets

U.S. PATENT DOCUMENTS

| | | | |
|---|---|---|---|
| 6,524,218 B1 * | 2/2003 | Yamada et al. | 477/5 |
| 6,598,496 B2 * | 7/2003 | Pannell | 74/665 L |
| 6,651,759 B1 * | 11/2003 | Gruenwald et al. | 180/65.2 |
| 6,656,083 B2 * | 12/2003 | Esaki | 477/5 |
| 6,672,415 B1 * | 1/2004 | Tabata | 180/65.2 |
| 6,709,362 B2 * | 3/2004 | Tomohiro et al. | 477/3 |
| 6,796,367 B2 * | 9/2004 | Blacquiere et al. | 165/41 |
| 2003/0148168 A1 * | 8/2003 | Enjoji et al. | 429/38 |

FOREIGN PATENT DOCUMENTS

| | | |
|---|---|---|
| DE | 211130 | 7/1984 |
| DE | 4113049 A1 | 12/1991 |
| DE | 4333478 A1 | 8/1994 |
| DE | 19712864 C2 | 10/1998 |
| EP | 0645271 A2 | 3/1995 |
| JP | 3-276573 | 6/1991 |
| JP | 2000182631 | 6/2000 |

OTHER PUBLICATIONS

European Search Report for Application No. 03250740.2—2207, dated Jul. 25, 2006.

* cited by examiner

VEHICLE WITH ELECTRIC MOTOR MOUNTED THEREON

BACKGROUND OF THE INVENTION

1. Field of the Invention

The present invention relates to a vehicle which is propelled by an electric motor mounted on the vehicle.

2. Description of the Related Art

One type of vehicles which are propelled by an electric motor mounted thereon is a fuel cell vehicle using a solid polymer electrolyte fuel cell. The solid polymer electrolyte fuel cell has a membrane electrode assembly comprising an anode electrode and a cathode electrode and an electrolyte membrane interposed between the electrodes. The electrolyte membrane comprises a solid polymer ion exchange membrane (proton ion exchange membrane). The membrane electrode assembly is sandwiched between separators.

Usually, membrane electrode assemblies and separators are alternately stacked to assemble fuel cells as a fuel cell stack. When a fuel gas, e.g., a hydrogen-containing gas, supplied to each of the anode electrodes of the fuel cell stack, the hydrogen in the gas is ionized on the electrode catalyst and moves through the electrolyte membrane, which is humidified to a suitable level, to the cathode electrode. Electrons produced while the hydrogen is in motion are supplied to an external circuit, which uses the electrons as an electric energy in the form of a direct current.

Since the cathode electrode is supplied with an oxygen-containing gas such as air, hydrogen ions, electrons, and the oxygen gas react with each other on the cathode electrode, producing water.

Fuel cell vehicles employ a fuel cell system which incorporates the above fuel cell stack. As shown in FIG. 25 of the accompanying drawings, a conventional fuel cell system 1 has a fuel cell stack (electric energy supply mechanism) 2 connected to a fuel gas supply unit 3 for supplying a fuel gas such as a hydrogen-containing gas, a coolant fluid supply unit 4 for supplying a coolant fluid, and an oxygen-containing gas supply unit 5 for supplying an oxygen-containing gas such as air.

The fuel gas supply unit 3 has a fuel gas pump (reactant gas supply pump) 6 which is connected to a fuel gas passage (not shown) in the fuel cell stack 2 by a fuel gas supply passage 7. The fuel gas supply unit 3 also has an electric motor 8 coupled to the fuel gas pump 6.

The coolant fluid supply unit 4 has a coolant fluid pump (coolant fluid supply pump) 9 which is connected to a coolant fluid passage (not shown) in the fuel cell stack 2 by a coolant fluid supply passage 10. The coolant fluid supply unit 4 also has an electric motor 11 coupled to the coolant fluid pump 9.

The oxygen-containing gas supply unit 5 has a supercharger (reactant gas supply pump) 12 which is connected to an oxygen-containing gas passage (not shown) in the fuel cell stack 2 by an oxygen-containing gas supply passage 13. The oxygen-containing gas supply unit 5 also has an electric motor 14 coupled to the supercharger 12.

The fuel cell stack 2 supplies electric energy to a main electric motor 15 which is operatively coupled by a transmission 16 to axles 17 with respective tires 18 mounted thereon. The fuel cell stack 2 also supplies electric energy to the electric motors 8, 11, 14 and an electric motor 20 coupled to an air-conditioning compressor 19.

With the conventional fuel cell system 1, the dedicated electric motors 8, 11, 14 are provided for driving the fuel gas pump 6, the coolant fluid pump 9, and the supercharger 12 which serve as devices for supplying the reactant gases and the coolant fluid, and those electric motors 8, 11, 14 require their own drive units (not shown).

The dedicated electric motor 20 associated with the air-conditioning compressor 19 has to be driven. As a result, the overall energy efficiency and space efficiency of the fuel cell system 1 are considerably lowered, the number of parts used is increased, the fuel cell system 1 is complex in structure, and the manufacturing cost of the fuel cell system 1 is high.

There is known in the art a fuel cell engine having at least one wheel motor for rotating tires and a primary motor for actuating various auxiliary equipment, as disclosed in U.S. Pat. No. 6,223,844, for example.

Usually, a relatively large output power is required to accelerate a vehicle. According to the above known fuel cell engine, therefore, the primary motor is of a large size for imparting a desired drive power to the various auxiliary equipment. Even when the vehicle is operating in a mode in which the fuel cell can be kept in a low output level, such as when the vehicle is in an idling mode, the fuel cell generates an unnecessarily large amount of electric energy because the primary motor produces a large output power. The fuel cell engine is thus not efficient in operation.

Furthermore, when the fuel cell is to be shut off while the vehicle is running, the auxiliary equipment and the air-conditioning system need to be turned off independently by the primary motor. Accordingly, the fuel cell is poor in efficiency.

SUMMARY OF THE INVENTION

It is a major object of the present invention to provide a vehicle with an electric motor mounted thereon, which is relatively small in size and simple in structure, and which can be kept in an efficient mode of operation.

According to the present invention, a vehicle which can be propelled by an electric motor mounted thereon has a drive power transmitting mechanism for engaging and disengaging a main electric motor and auxiliary equipment, and transmitting a drive power from the main electric motor to the auxiliary equipment, and an auxiliary electric motor connectable coaxially or parallel to the main electric motor for transmitting a drive power to the auxiliary equipment depending on the manner in which the vehicle is operated, when necessary. The auxiliary equipment includes devices which are installed in the vehicle and require electric energy as a drive power.

The vehicle can be accelerated when the main electric motor is assisted by the auxiliary electric motor. The drive power for the auxiliary equipment is supplied from either the main electric motor or the auxiliary electric motor or both the main electric motor and the auxiliary electric motor depending on the manner in which the vehicle is operated. Therefore, the vehicle can be reduced in size and simplified in structure in its entirety, and the overall energy efficiency and power capabilities of the vehicle can effectively be increased.

The vehicle further has an electric energy supply mechanism for supplying electric energy to at least the main electric motor, and an electric energy storage mechanism for storing regenerated electric energy produced by the main electric motor and supplying the stored electric energy to the main electric motor and/or the auxiliary electric motor when necessary.

Consequently, the regenerated electric energy produced by the main electric motor can effectively be utilized. When the electric energy storage mechanism is fully charged, the regenerated electric energy is supplied to the auxiliary electric motor. The regenerated electric energy is thus used as an energy source for the auxiliary equipment, and prevents the braking force applied to the vehicle from being changed.

The electric energy supply mechanism comprises a fuel cell stack having electrolyte electrode assemblies, each comprising a pair of electrodes and an electrolyte interposed between the electrodes, and separators which are alternately stacked. The auxiliary equipment includes a reactant gas supply pump for supplying a reactant gas which is at least either a fuel gas or an oxygen-containing gas to the fuel cell stack.

For accelerating the vehicle, the main electric motor and the auxiliary electric motor supply electric energy (drive power) to the auxiliary equipment, and a shortage in the electric energy outputted from the fuel cell stack is made up for by the assistive electric energy outputted from the electric energy storage mechanism. Thus, the vehicle can be accelerated well. For lowering the electric energy outputted from the fuel cell stack such as when the vehicle is idled, only the auxiliary electric motor supplies the drive power to the auxiliary equipment. Thus, the electric energy outputted from the fuel cell stack can be reduced well. The energy efficiency of the fuel cell system is thus increased.

The auxiliary equipment also includes a coolant fluid supply pump for supplying a coolant fluid to the fuel cell stack. The fuel cell stack may be cooled by air as well as the coolant fluid.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
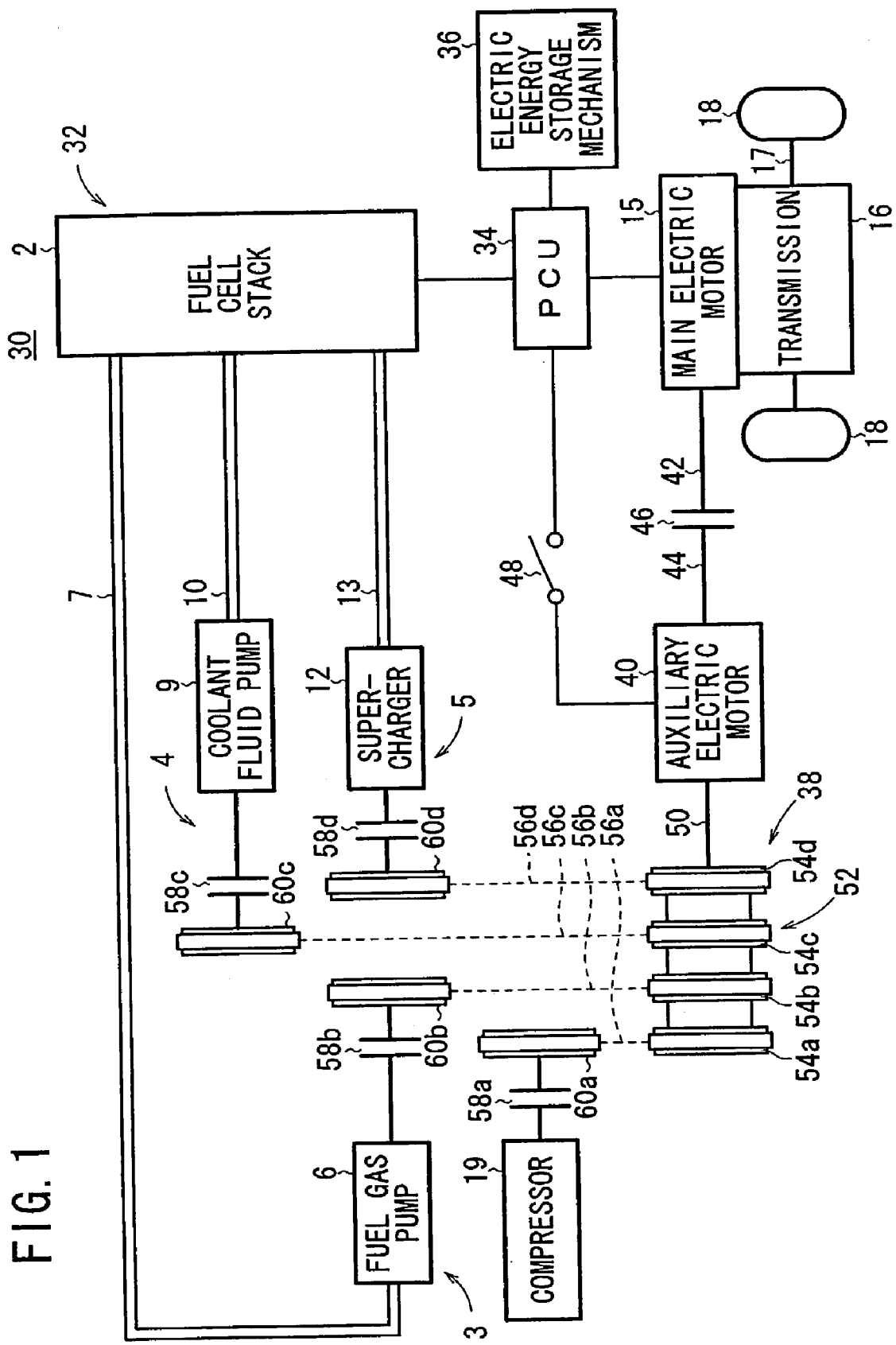
FIG. 1 is a schematic diagram of a vehicle with an electric motor mounted thereon according to a first embodiment of the present invention.
Figure 2:
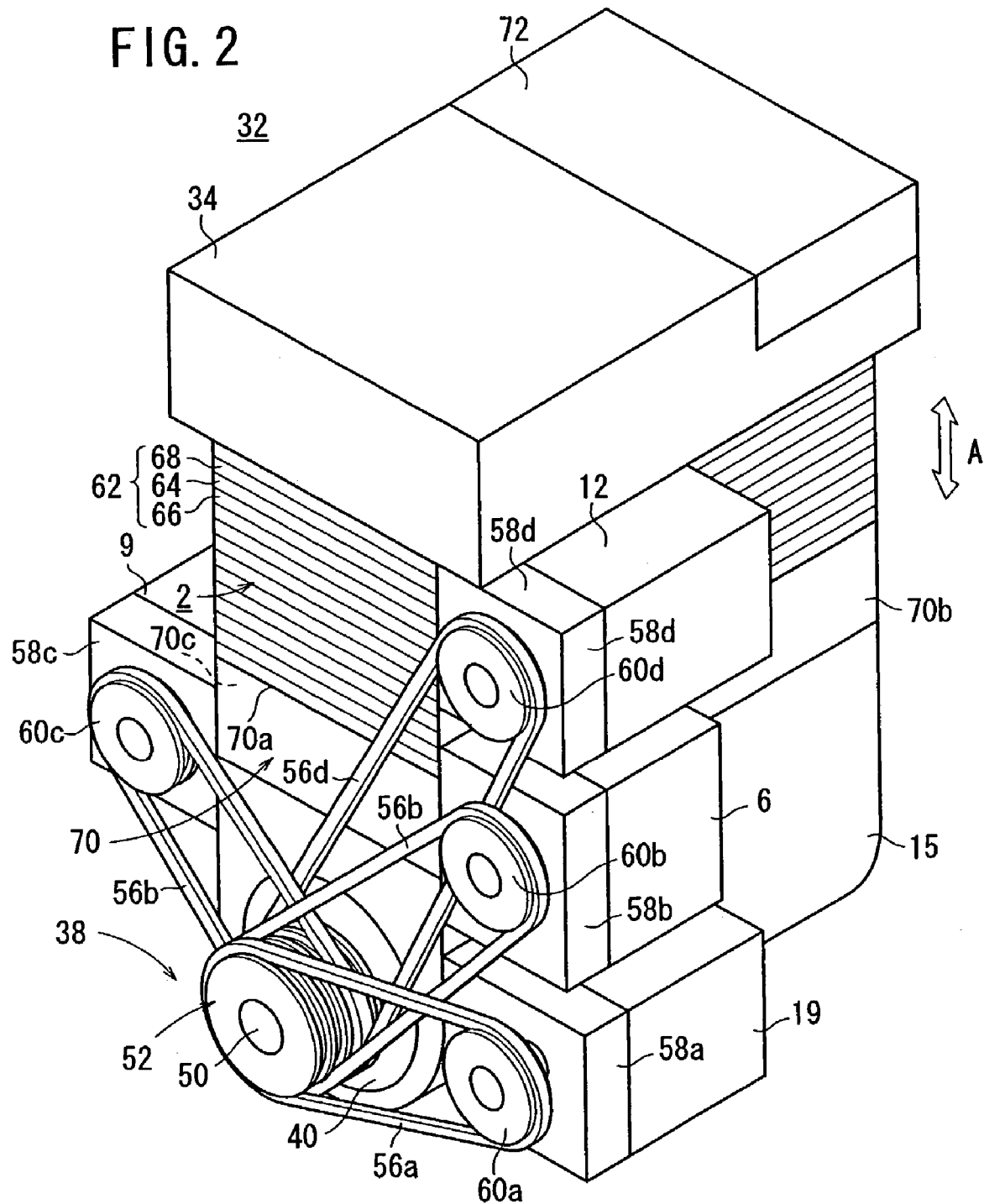
FIG. 2 is a perspective view of a fuel cell system of the vehicle.
Figure 25:
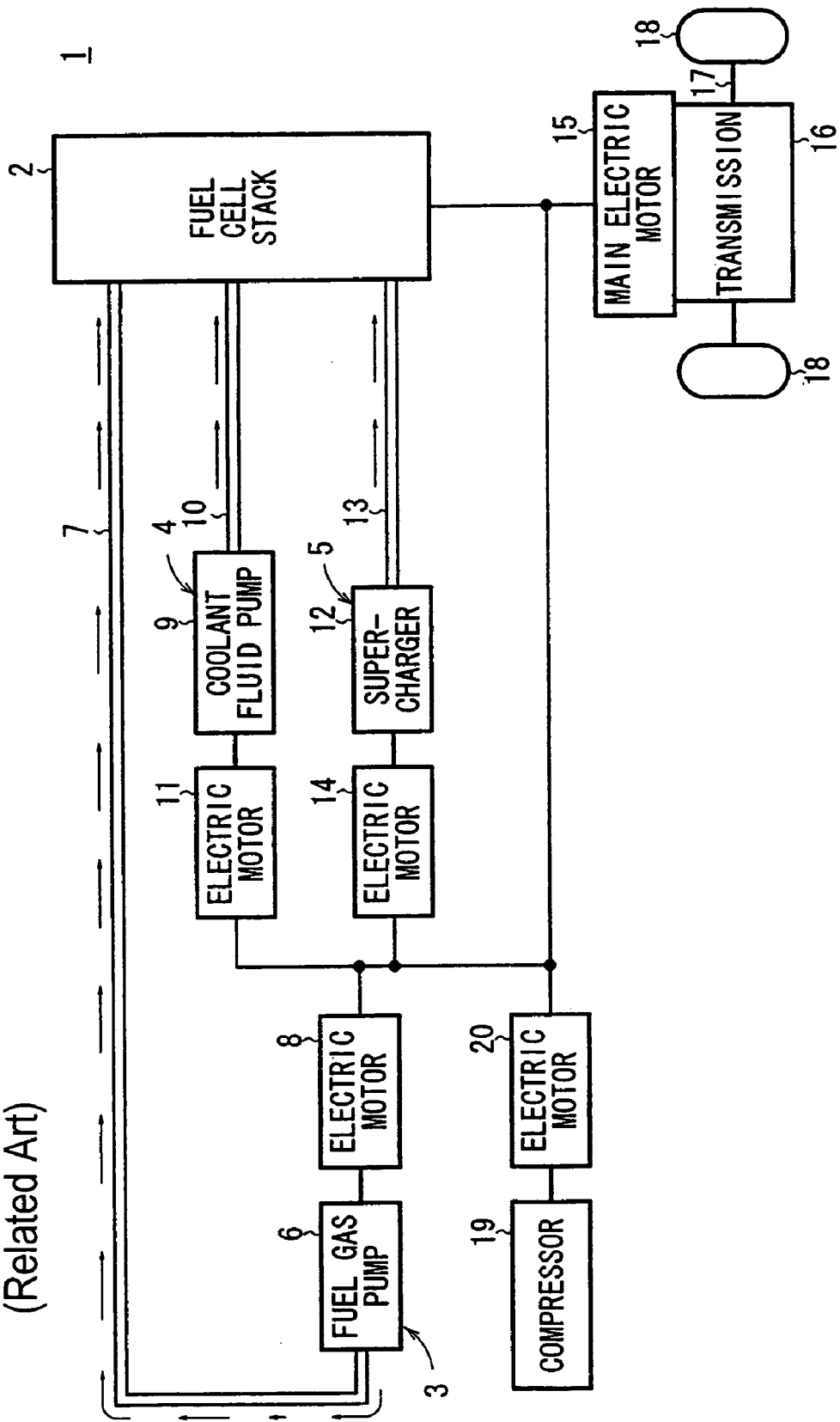
FIG. 25 is a schematic diagram of a conventional fuel cell system.

FIG. 1 schematically shows a vehicle 30 with an electric motor mounted thereon according to a first embodiment of the present invention. FIG. 2 shows in perspective a fuel cell system 32 of the vehicle 30. Those parts shown in FIGS. 1 and 2 which are identical to those of the fuel cell system 1 shown in FIG. 25 are denoted by identical reference characters, and will not be described in detail below.

The fuel cell system 32 has a fuel cell stack 2 electrically connected to a main electric motor 15 and an electric energy storage mechanism 36 by a PCU (Power Control Unit) 34.

The fuel cell system 32 has a main electric motor 15, a drive power transmitting mechanism 38 for engaging and disengaging a fuel gas pump 6, a coolant fluid pump 9, a supercharger 12, and a compressor 19, which serve as auxiliary equipment, and transmitting a drive power to the auxiliary equipment, and an auxiliary electric motor 40 coaxially connectable to the main electric motor 15 for transmitting a drive power to the auxiliary equipment depending on the manner in which the vehicle 30 is operated. The electric energy storage mechanism 36 comprises a capacitor or a secondary cell, for example.

The main electric motor 15 has a drive shaft 42 and the auxiliary electric motor 40 has an input shaft 44 coaxial with the drive shaft 42. The drive shaft 42 and the input shaft 44 can be connected to and disconnected from each other by a clutch mechanism 46 or a continuously variable transmission mechanism. The auxiliary electric motor 40 is electrically connectable to the PCU 34 by a switch 48.

The drive power transmitting mechanism 38 has a pulley 52 coaxially connected to an output shaft 50 of the auxiliary electric motor 40. The pulley 52 has four belt grooves 54a, 54b, 54c, 54d defined in an outer circumferential surface thereof and extending parallel to each other. First through fourth drive belts 56*a*, 56*b*, 56*c*, 56*d* (see FIGS. 1 through 3) engage respectively in the belt grooves 54*a*, 54*b*, 54*c*, 54*d*. The pulley 52 may be replaced with a gear connected to the output shaft 50, and the drive belts 56*a*, 56*b*, 56*c*, 56*d* may be replaced with gears held in mesh with the gear connected to the output shaft 50.

The compressor 19, the fuel gas pump 6, the coolant fluid pump 9, and the supercharger 12 are operatively connected to respective pulleys 60*a*, 60*b*, 60*c*, 60*d* by respective clutch mechanisms 58*a*, 58*b*, 58*c*, 58*d*. The first through fourth drive belts 56*a*, 56*b*, 56*c*, 56*d* are trained respectively around the pulleys 60*a*, 60*b*, 60*c*, 60*d*.

Figure 3:
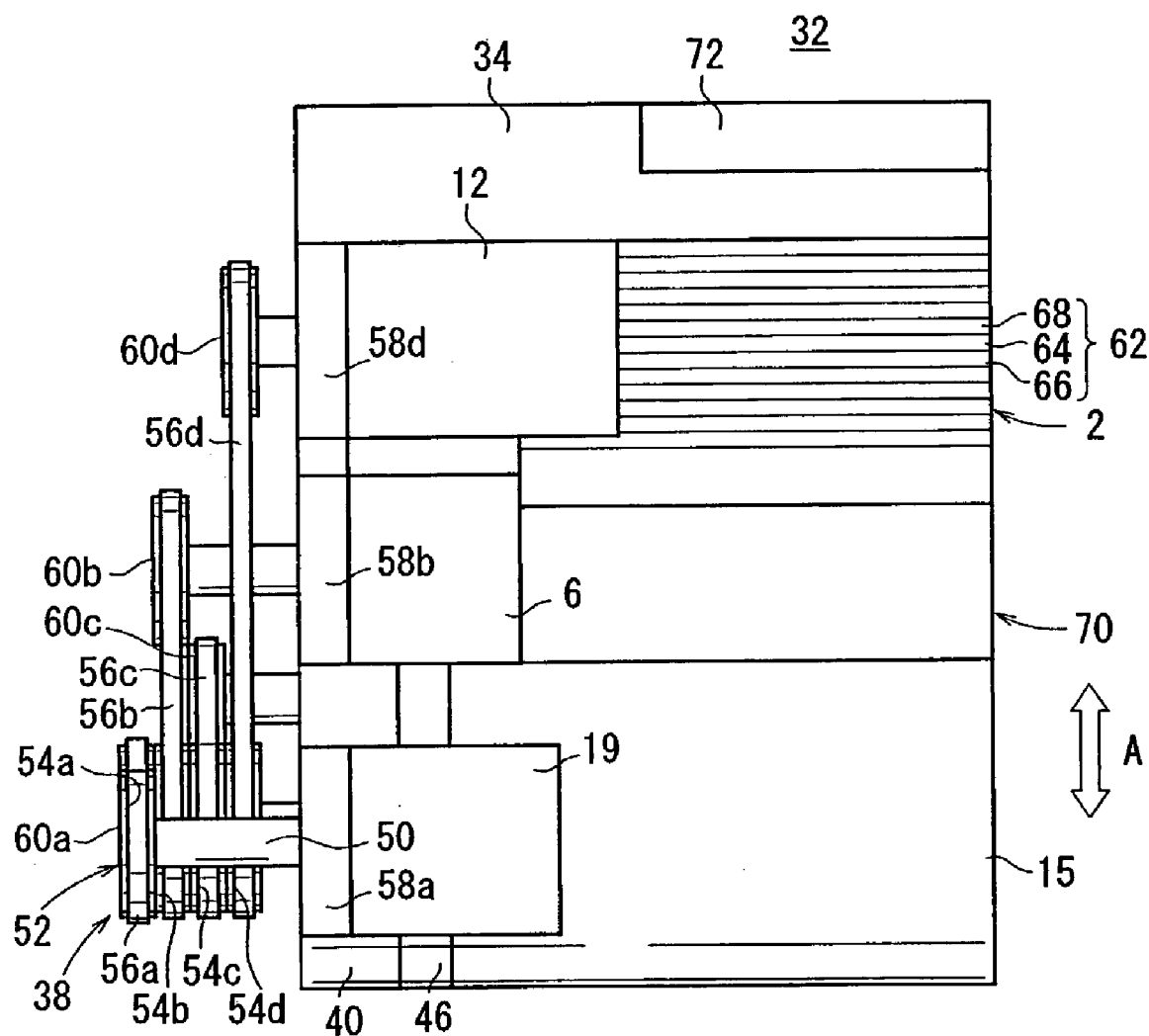
FIG. 3 is a side elevational view of the fuel cell system.

As shown in FIGS. 2 and 3, the fuel cell stack 2 comprises a plurality of unit fuel cells 62 stacked in the vertical direction indicated by the arrow A. Each of the unit fuel cells 62 comprises a membrane (electrolyte) electrode assembly 64 and first and second separators 66, 68 sandwiching the membrane electrode assembly 64 therebetween.

The fuel cell stack 2 is fixedly mounted on an upper surface 70*a* of a manifold block 70. The PCU 34 and an air-conditioning unit 72 are mounted on an upper surface of the fuel cell stack 2.

The main electric motor 15, the clutch mechanism 46, and the auxiliary electric motor 40 are coaxially coupled to each other and mounted on a lower surface of the manifold block 70. The compressor 19 is mounted on a side of the main electric motor 15 parallel thereto. The supercharger 12 and the fuel gas pump 6 are fixed to a side 70*b* of the manifold block 70. The coolant fluid pump 9 is mounted on an opposite side 70*c* of the manifold block 70.

The manifold block 70 has passages (not shown) defined therein for supplying a fuel gas, a coolant fluid, and an oxygen-containing gas from the fuel gas pump 6, the coolant fluid pump 9, and the supercharger 12 into the fuel cell stack 2, and discharging the fuel gas, the coolant fluid, and the oxygen-containing gas, which have been used, from the fuel cell stack 2.

Operation of the vehicle 30 thus constructed will be described below.

Figure 4:
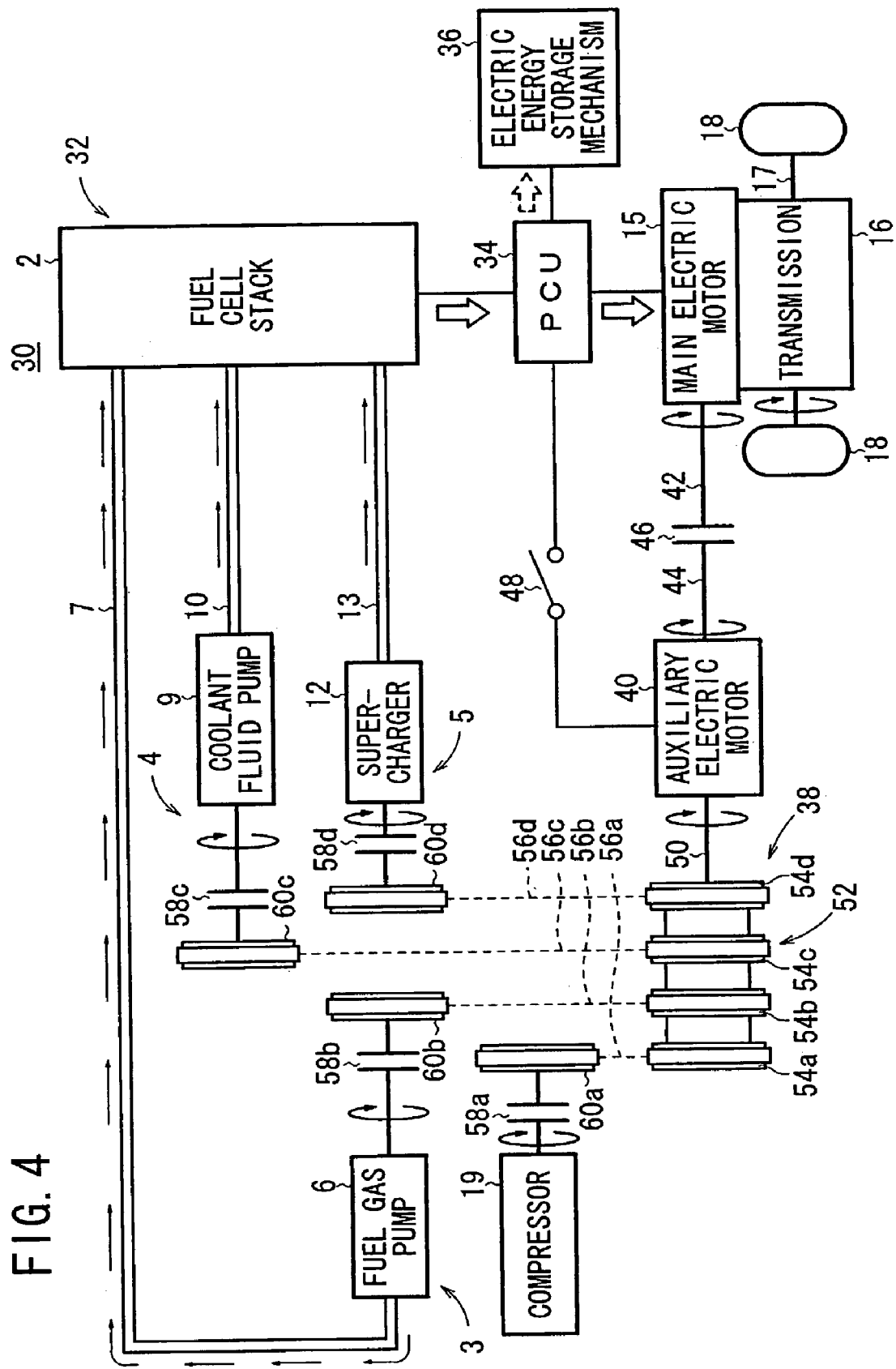
FIG. 4 is a schematic diagram of the vehicle when it is in a normal running mode.
Figure 5:
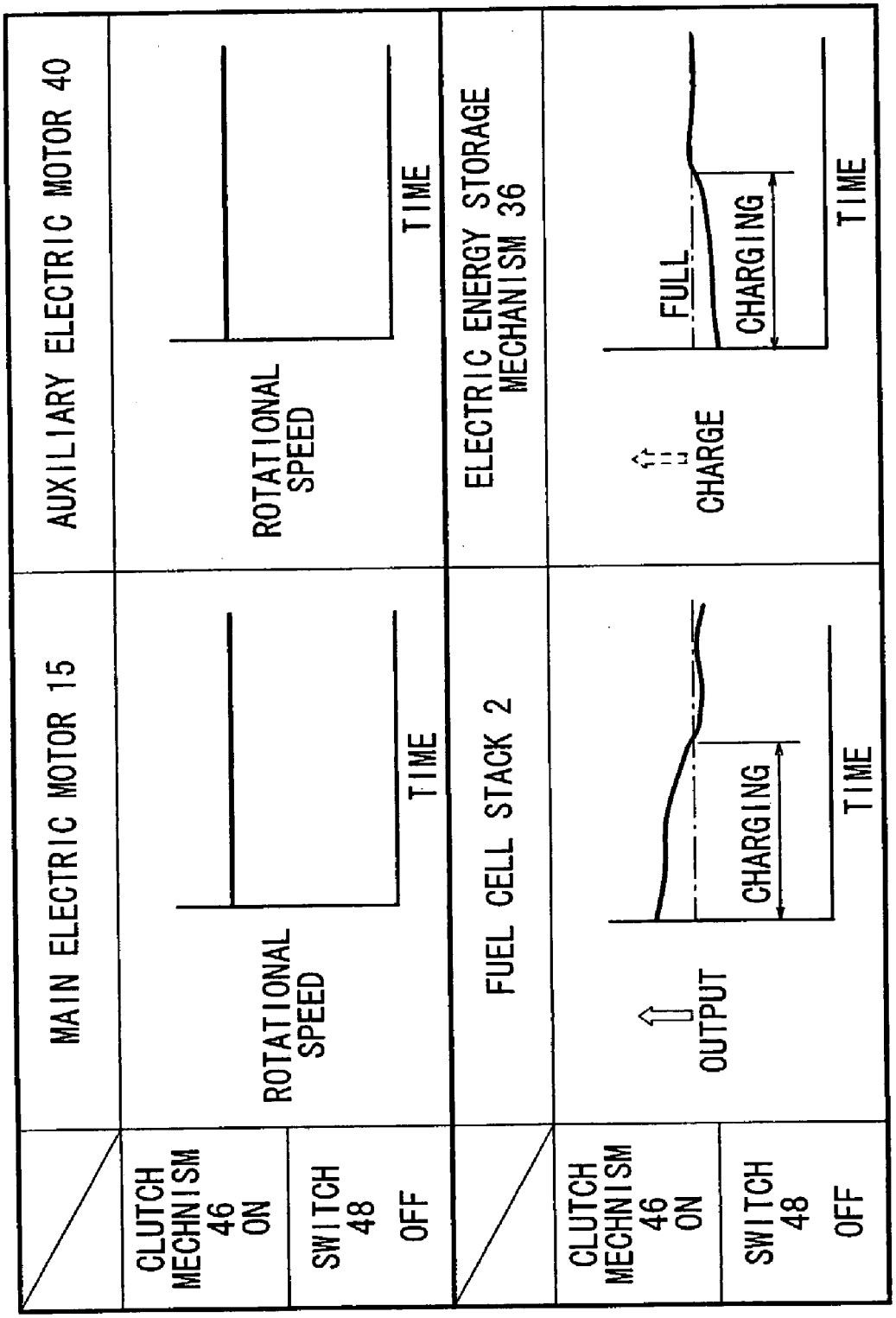
FIG. 5 is a diagram showing operational states of various components of the vehicle when it is in the normal running mode.

For propelling the vehicle 30 in a normal (steady) running mode, as shown in FIGS. 4 and 5, the clutch mechanism 46 is engaged, and the switch 48 is turned off. The main electric motor 15 is supplied with electric energy from the fuel cell stack 2, and hence energized to cause the transmission 16 to transmit a rotary power to the axles 17, which rotate the tires 18 in a given direction to propel the vehicle 30.

The drive shaft 42 of the main electric motor 15 is connected to the input shaft 44 of the auxiliary electric motor 40 by the clutch mechanism 46. Therefore, the main electric motor 15 has its rotary drive power transmitted to the pulley 52 coupled to the output shaft 50 of the auxiliary electric motor 40. The first through fourth drive belts 56*a*, 56*b*, 56*c*, 56*d* engage respectively in the belt grooves 54*a*, 54*b*, 54*c*, 54*d* of the pulley 52. Therefore, when the pulley 52 is rotated, the first through fourth drive belts 56*a*, 56*b*, 56*c*, 56*d* run in circulatory motion, rotating the corresponding pulleys 60*a*, 60*b*, 60*c*, 60*d*.

The clutch mechanisms 58*b*, 58*c*, 58*d* are engaged. Therefore, the rotation of the pulleys 60*b*, 60*c*, 60*d* applies the drive power to the fuel gas pump 9, the coolant fluid pump 9, and the supercharger 12. Therefore, the fuel cell stack 2 is supplied with the fuel gas such as a hydrogen-containing gas or the like, the coolant fluid such as pure water, ethylene glycol, oil, or the like, and the oxygen-containing gas such as air, through the manifold block 70.

Consequently, as shown in FIGS. 2 and 3, in each of the unit fuel cells 62, the oxygen-containing gas supplied to the cathode electrode (not shown) of the membrane electrode assembly 64 and the fuel gas supplied to the anode electrode (not shown) of the membrane electrode assembly 64 are consumed by an electrochemical reaction in the electrode catalyst, generating electric energy. The generated electric energy is supplied to the main electric motor 15, which operates as a power plant to drive the axles 17 and the fuel gas pump 9, the coolant fluid pump 9, and the supercharger 12 which serve as auxiliary equipment.

For actuating the air-conditioning unit 72, the clutch mechanism 58*a* is engaged to selectively operate the compressor 19 through the drive power transmitting mechanism 38. If the electric energy storage mechanism 36 has not been charged to a predetermined level, then it may be charged by the electric energy outputted from the fuel cell stack 2 (see FIG. 5).

Figure 6:
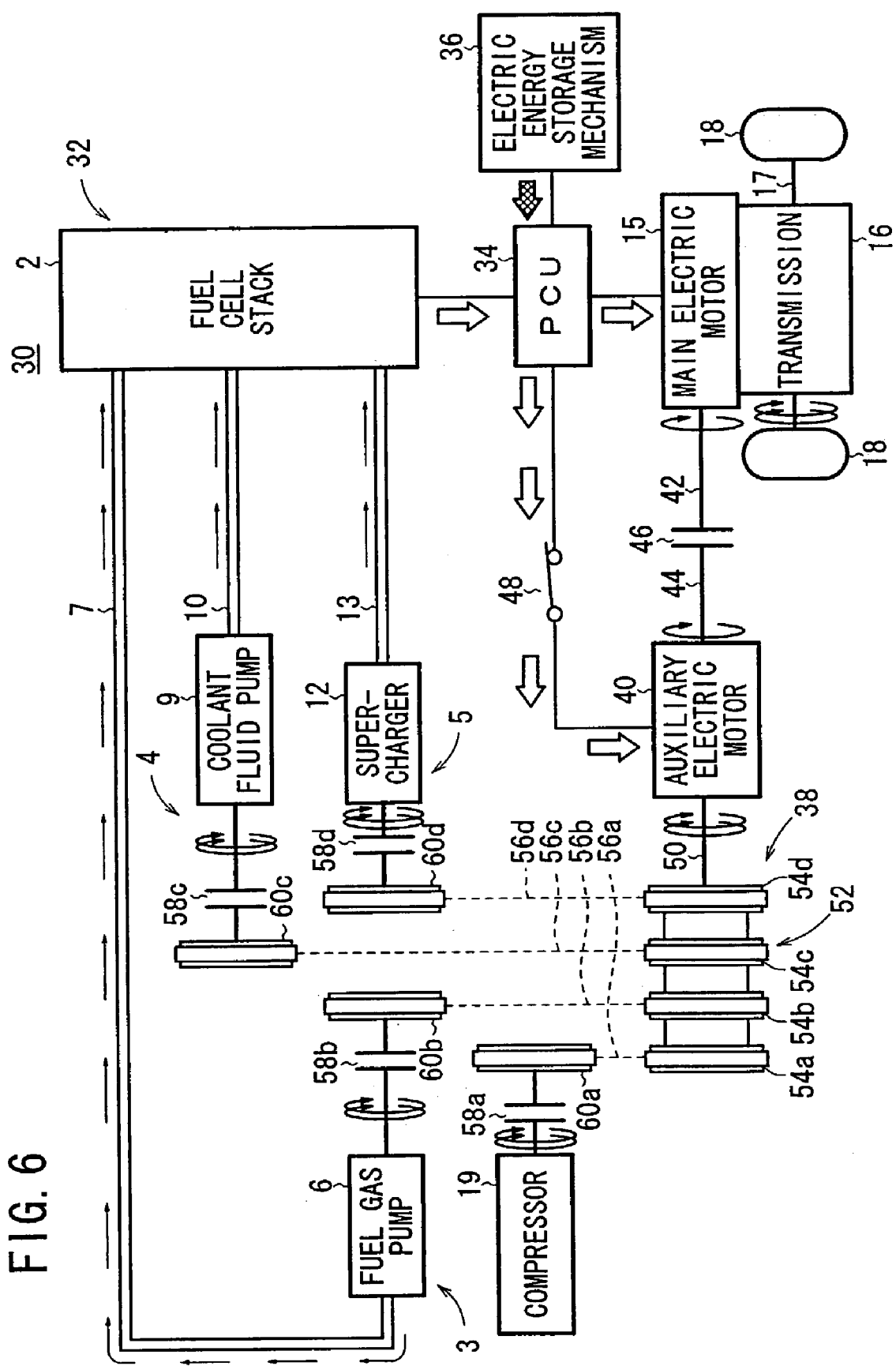
FIG. 6 is a schematic diagram of the vehicle when it is accelerated.
Figure 7:
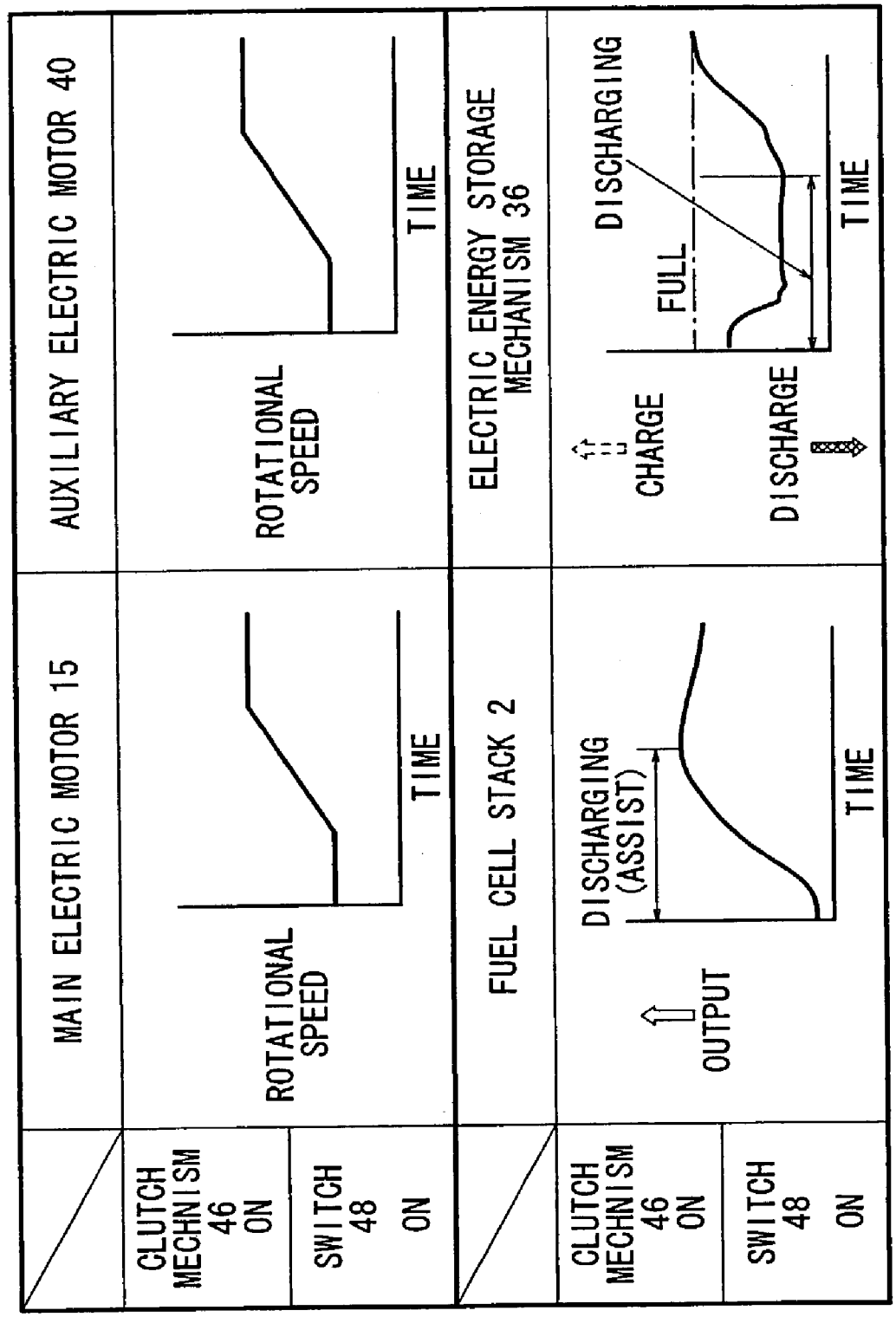
FIG. 7 is a diagram showing operational states of various components of the vehicle when it is accelerated.

For accelerating the vehicle 30, as shown in FIG. 6, the clutch mechanism 46 is engaged, and the switch 48 is turned on. As shown in FIG. 7, the rotation of the main electric motor 15, assisted by the rotation of the auxiliary electric motor 40, accelerates the vehicle 30. If the electric energy outputted from fuel cell stack 2 is not sufficient at this time, then the electric energy storage mechanism 36 supplies (discharges) stored electric energy to assist in supplying electric energy to the main electric motor 15 and the auxiliary electric motor 40.

Figure 8:
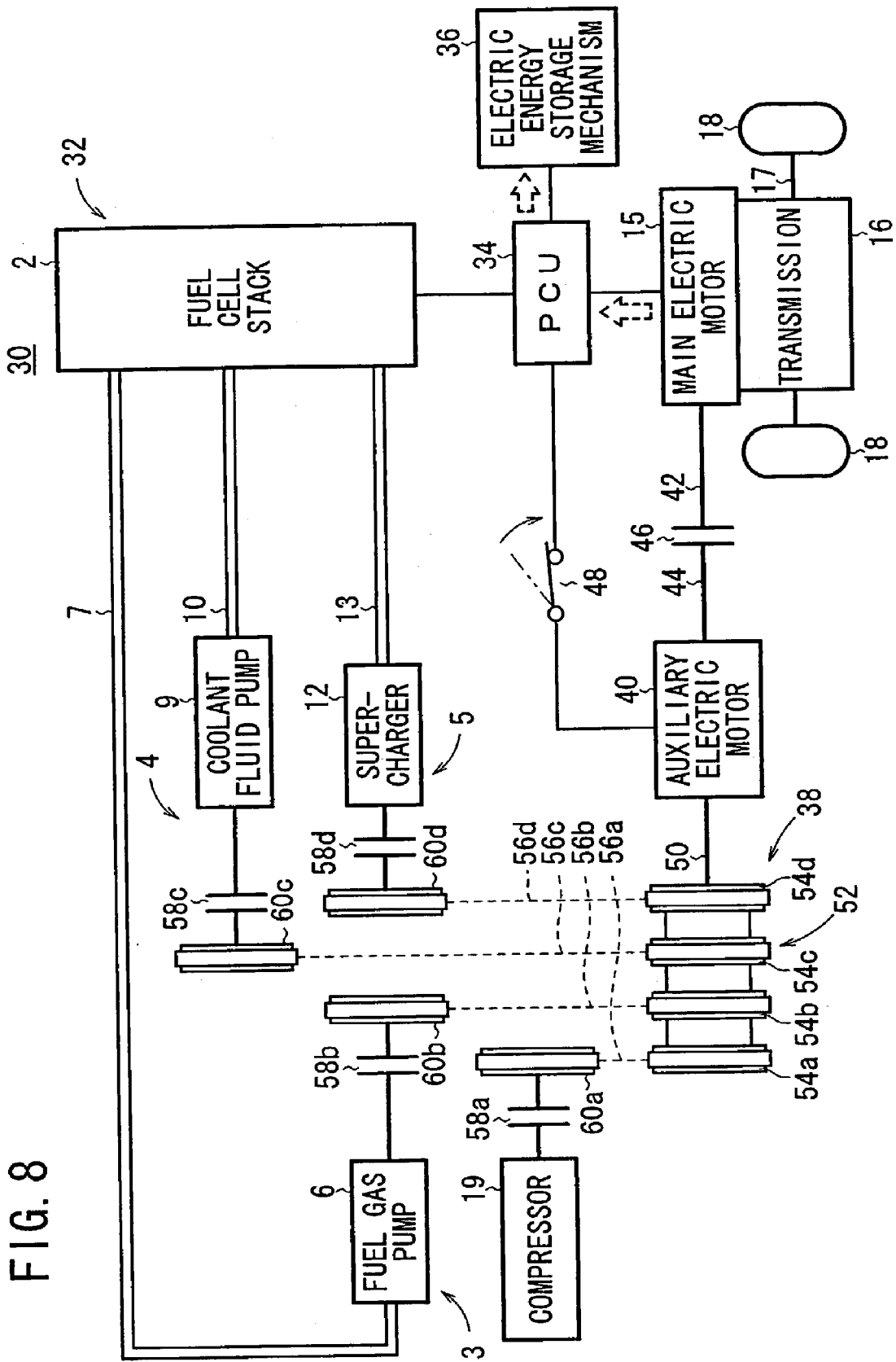
FIG. 8 is a schematic diagram of the vehicle when it is decelerated.
Figure 9:
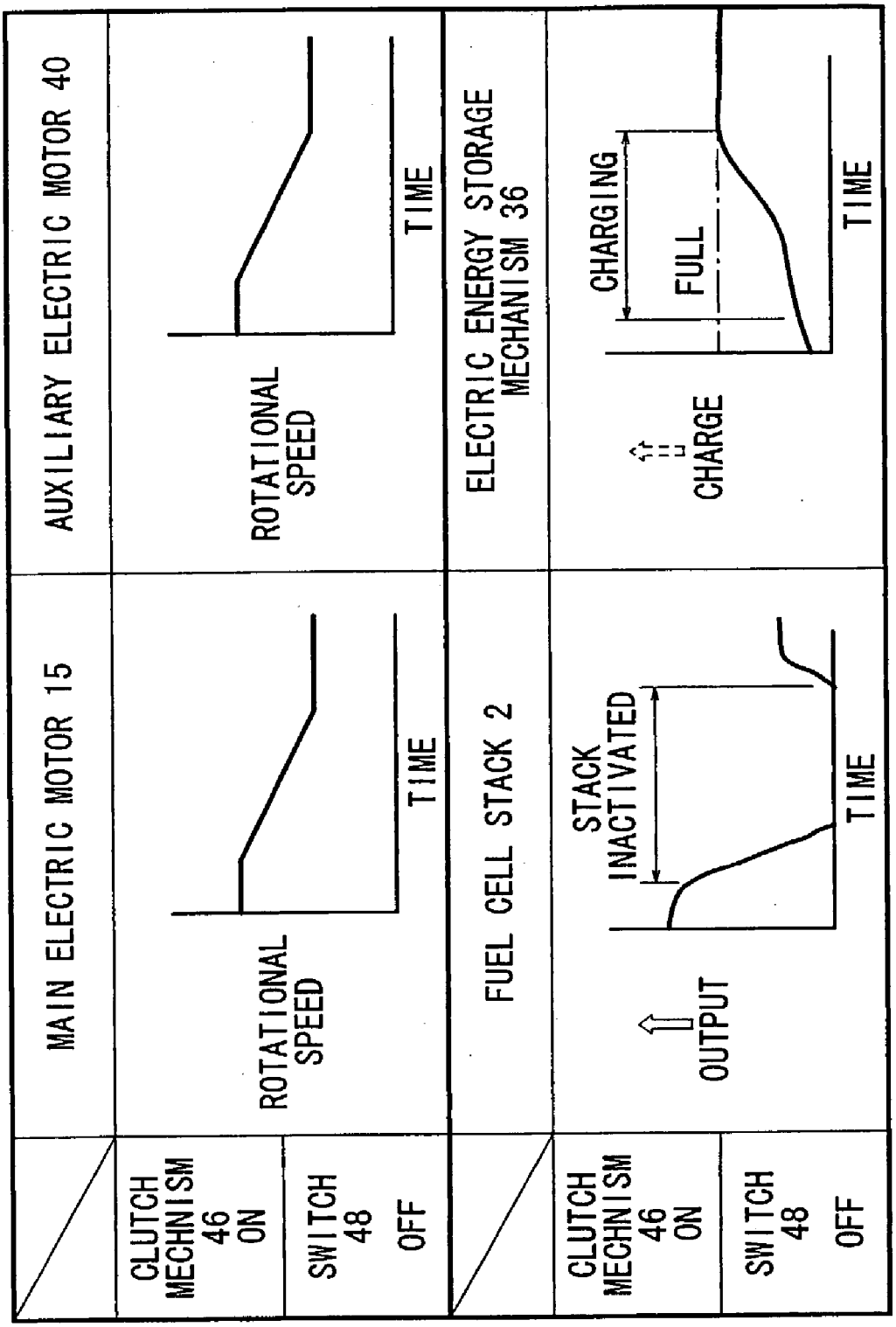
FIG. 9 is a diagram showing operational states of various components of the vehicle when it is decelerated.

For decelerating the vehicle 30, as shown in FIGS. 8 and 9, the clutch mechanism 46 is engaged, and the switch 48 is turned off. The clutch mechanisms 58*b*, 58*c*, 58*d* are controlled for their engagement and disengagement to adjust the supply of the fuel gas, the coolant fluid, and the oxygen-containing gas to the fuel cell stack 2 depending on the electric energy outputted from the fuel cell stack 2.

The rotational speeds of the main electric motor 15 and the auxiliary electric motor 40 are lowered, and regenerated electric energy produced in a regenerative braking mode by the main electric motor 15 is supplied to charge the electric energy storage mechanism 36. When the electric energy storage mechanism 36 is charged to a predetermined level, i.e., fully charged, the switch 48 is turned on to make the electric circuit from the PCU 34 to the auxiliary electric motor 40.

The extra regenerated electric energy produced by the main electric motor 15 is supplied to the auxiliary electric motor 40, which operates the drive power transmitting mechanism 38. If necessary, the compressor 19 is actuated.

As described above, when the vehicle 30 is decelerated, the regenerated electric energy produced by the main electric motor 15 is supplied to charge the electric energy storage mechanism 36. Thereafter, the extra regenerated electric energy is supplied to the auxiliary electric motor 40. The extra regenerated electric energy thus supplied can thus be used as an energy source for the fuel gas pump 6, the coolant fluid pump 9, the supercharger 12, and the compressor 19. Consequently, after the electric energy storage mechanism 36 is charged to a predetermined level, the operation of the engine brake developed by the main electric motor 15 does not suffer changes, making it possible to apply a desired braking force to the vehicle 30.

Figure 10:
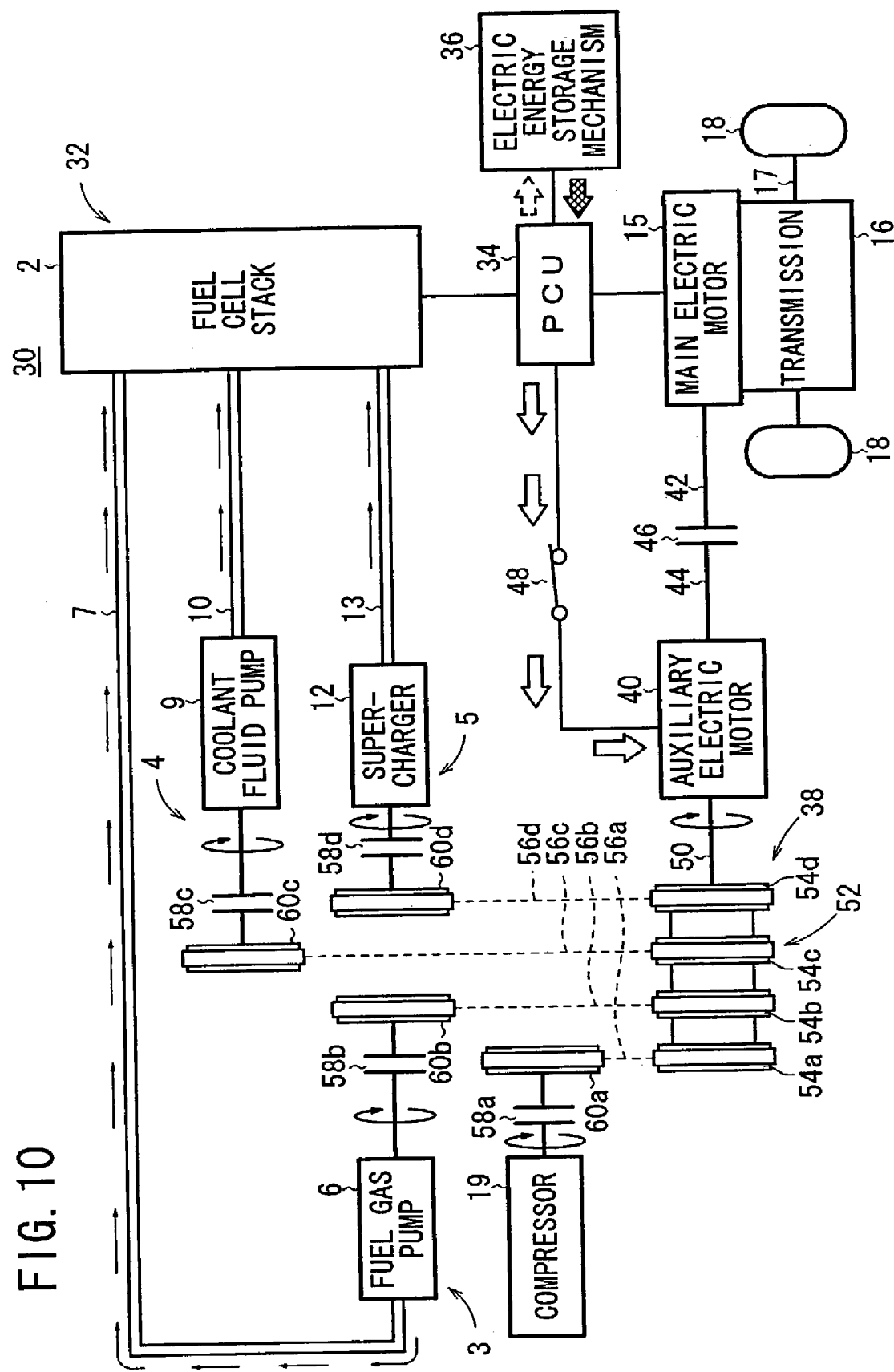
FIG. 10 is a schematic diagram of the vehicle when it is stopped.
Figure 11:
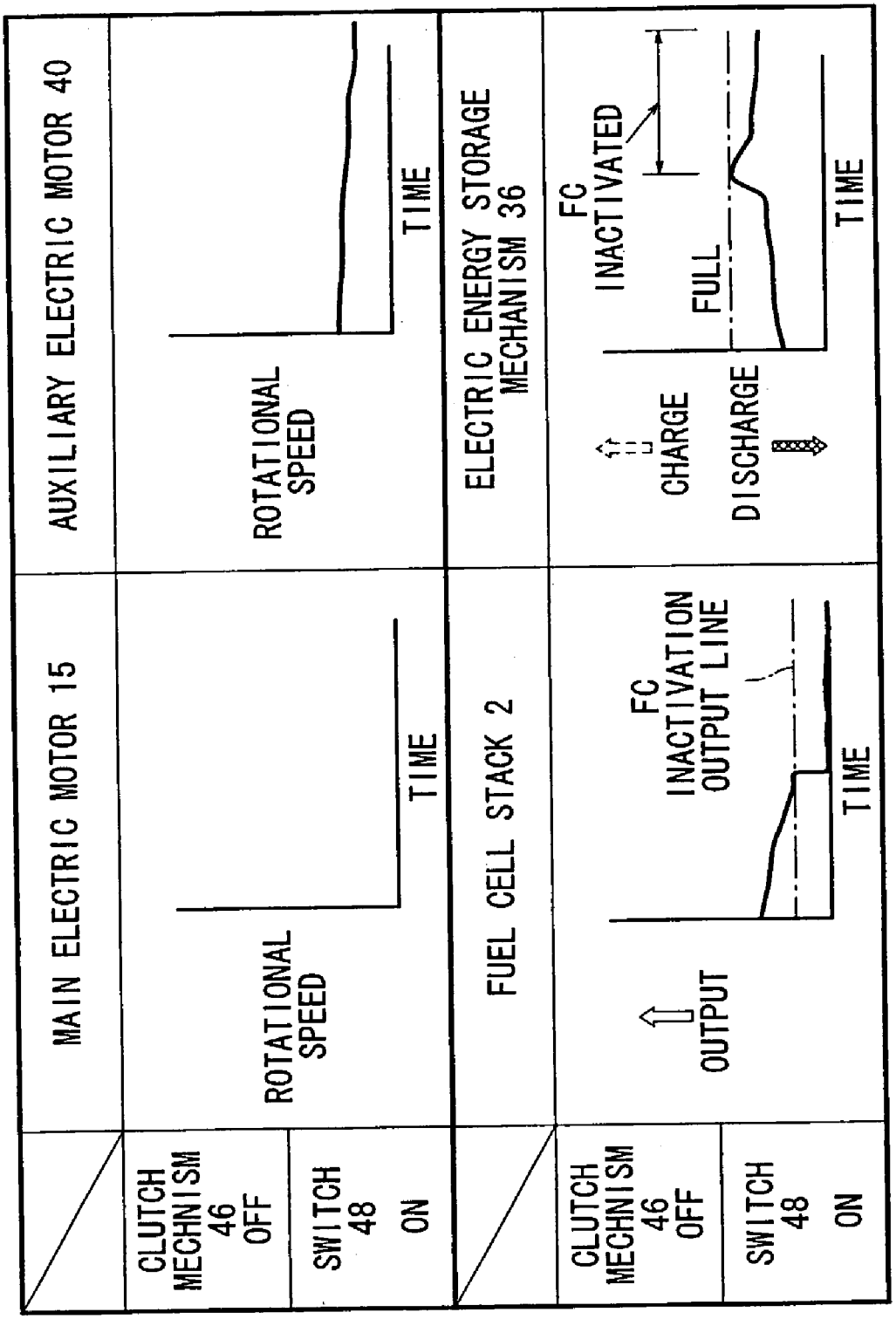
FIG. 11 is a diagram showing operational states of various components of the vehicle when it is stopped.

For stopping the vehicle 30 in an idling mode, as shown in FIGS. 10 and 11, the clutch mechanism 46 is disengaged. The fuel cell stack 2 outputs electric energy depending on loads such as electric lamps, etc. in the interior of the vehicle 30. The switch 48 is turned on to supply electric energy from the electric energy storage mechanism 36 to the auxiliary electric motor 40. The auxiliary electric motor 40 is energized to cause the drive power transmitting mechanism 38 to rotate the pulleys 60a, 60b, 60c, 60d.

The clutch mechanism 58a is engaged to cause the compressor 19 to operate the air-conditioning unit 72. The clutch mechanisms 58b, 58c, 58d are controlled for their engagement and disengagement to activate, generate electric energy in, and inactivate the fuel cell stack 2 depending on the remaining electric energy in the electric energy storage mechanism 36. The fuel cell stack 2 can thus be operated in a good-efficiency range.

Figure 12:
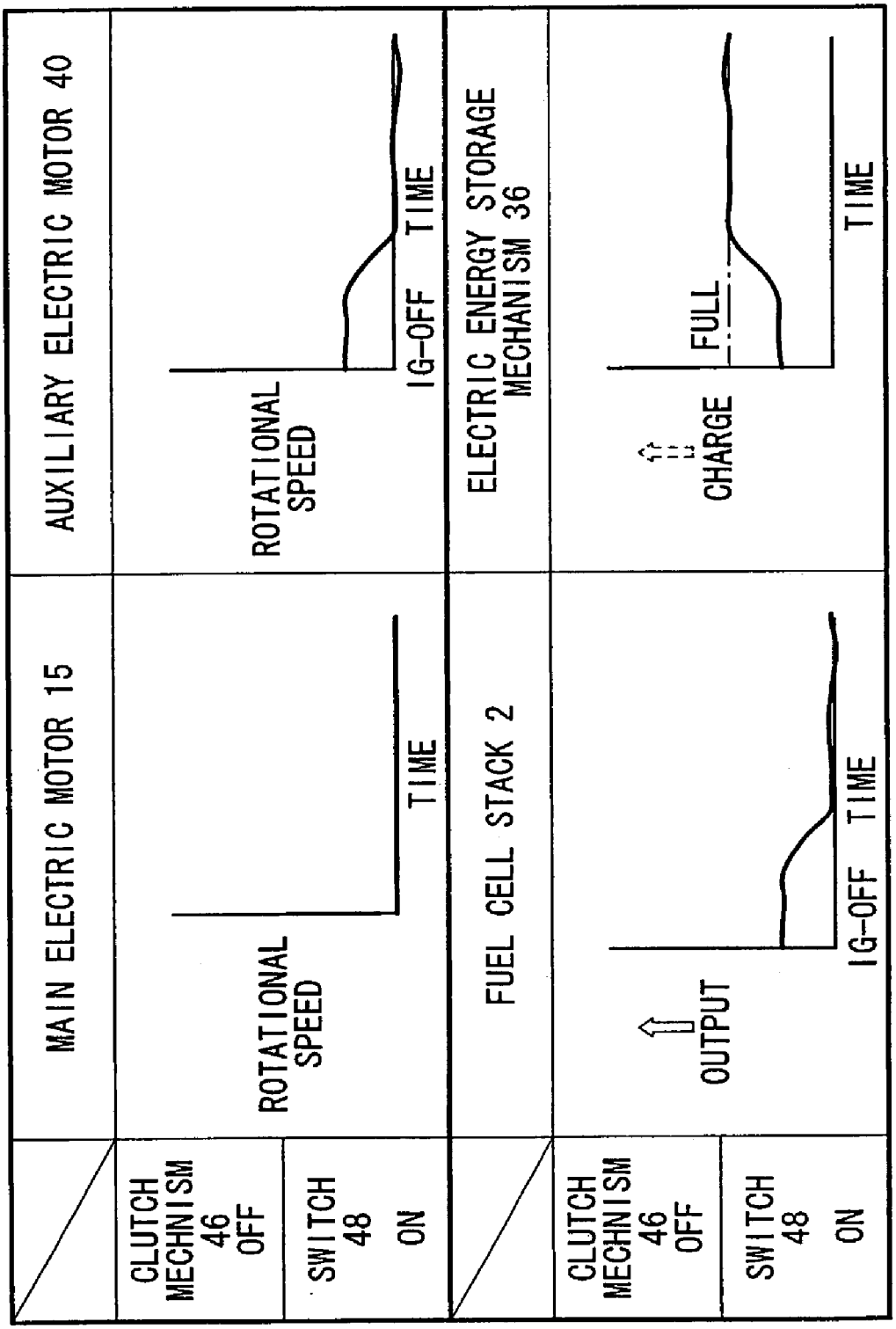
FIG. 12 is a diagram showing operational states of various components of the vehicle when the ignition switch thereof is turned off.

When the ignition switch (not shown) of the vehicle 30 is turned off, the vehicle 30 is controlled as shown in FIG. 12. The switch 48 is turned on depending on the remaining electric energy in the electric energy storage mechanism 36, energizing the auxiliary electric motor 40 to generate electric energy in the fuel cell stack 2. After the electric energy storage mechanism 36 is charged to a predetermined level, i.e., fully charged, the fuel cell stack 2 is automatically inactivated.

While the ignition switch is being turned on, the electric energy stored in the electric energy storage mechanism 36 may be consumed to a prescribed level to bring the electric energy storage mechanism 36 into a state capable of storing regenerated electric energy.

Figure 13:
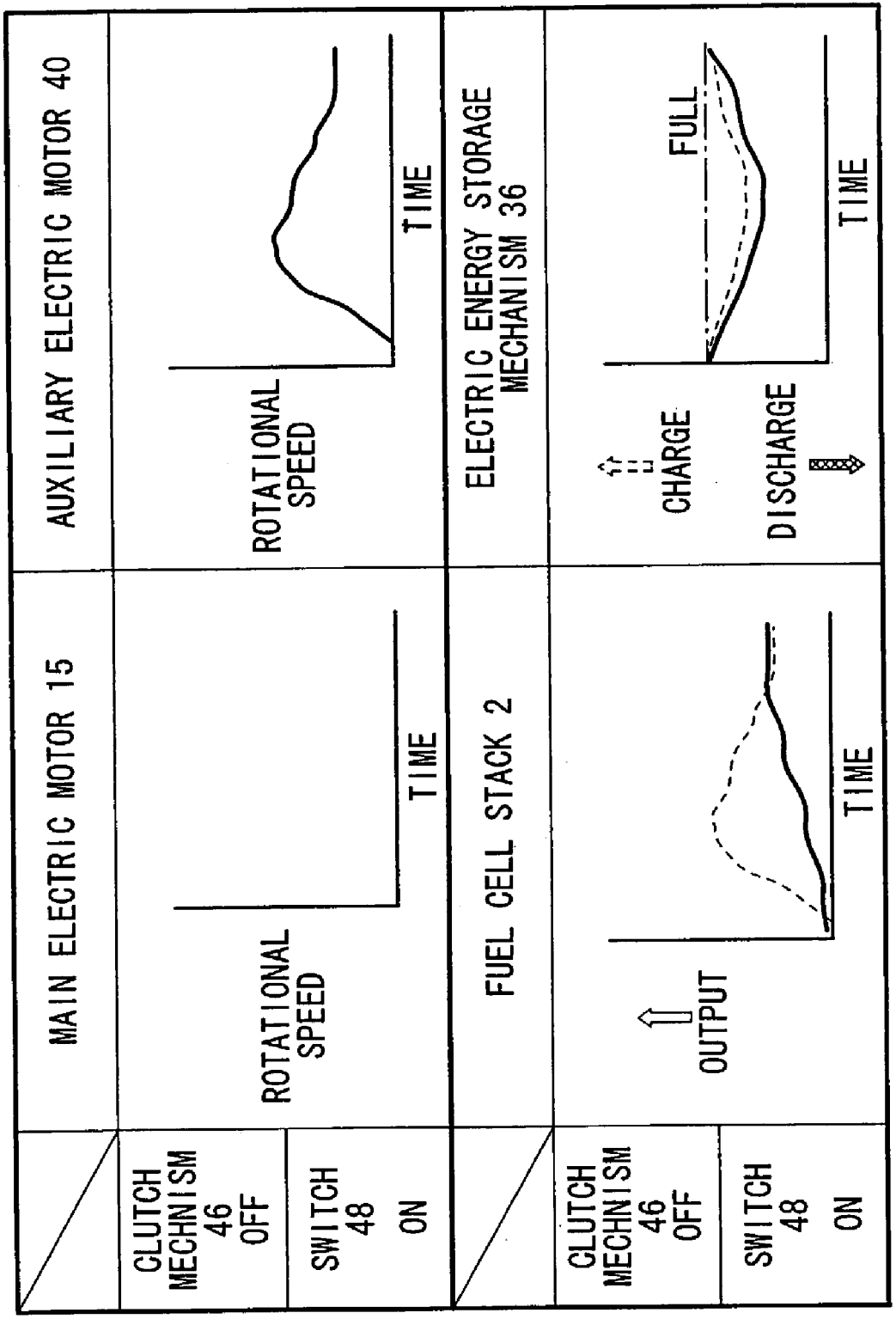
FIG. 13 is a diagram showing operational states of various components of the vehicle when it is started.

When the vehicle 30 is started (initially idled), as shown in FIGS. 10 and 13, the clutch mechanism 46 is disengaged, and the electric circuit from the fuel cell stack 2 to the auxiliary electric motor 40 is made, i.e., the switch 48 is turned on, to control the load on the fuel cell stack 2 depending on the manner in which the vehicle 30 is warmed up.

At this time, if a high load such as an electric heater is imposed when starting the vehicle 30, then the electric energy storage mechanism 36 outputs assistive electric energy. Basically, however, the electric energy storage mechanism 36 is repeatedly charged and discharged depending on the load imposed when the vehicle 30 is warmed up.

If the vehicle 30 starts to run while the vehicle 30 is being warmed up, then the main electric motor 15 is energized with the clutch mechanism 46 disengaged. When the main electric motor 15 is synchronized with the auxiliary electric motor 40, the clutch mechanism 46 is engaged to operate the vehicle 30 in the normal running mode.

According to the first embodiment, as described above, the drive power for the auxiliary equipment including the fuel gas pump 6, the coolant fluid pump 9, the supercharger 12, and the compressor 19 is supplied from either the main electric motor 15, or the auxiliary electric motor 40, or both the main electric motor 15 and the auxiliary electric motor 40 depending on the manner in which the vehicle 30 is operated.

For example, for accelerating the vehicle 30, the main electric motor 15 and the auxiliary electric motor 40 supply the drive power to the auxiliary equipment, and a shortage in the electric energy outputted from the fuel cell stack 2 is made up for by the assistive electric energy outputted from the electric energy storage mechanism 36. Thus, the vehicle 30 can be accelerated well.

For lowering the electric energy outputted from the fuel cell stack 2 such as when the vehicle 30 is idled, only the auxiliary electric motor 40 supplies the drive power to the auxiliary equipment. Thus, the electric energy outputted from the fuel cell stack 2 can be reduced well. The energy efficiency of the fuel cell system 32 is thus increased.

According to the first embodiment, the vehicle 30 can be reduced in size and simplified in structure in its entirety, and the overall energy efficiency and power capabilities of the vehicle 30 can effectively be increased.

Since the regenerated electric energy produced by the main electric motor 15 is stored in the electric energy storage mechanism 36, the regenerated electric energy can effectively be utilized. After the electric energy storage mechanism 36 is fully charged, the extra regenerated electric energy is supplied to the auxiliary electric motor 40 thereby to prevent the braking force applied to the vehicle 30 from being changed.

The auxiliary equipment and the auxiliary electric motor 40 are connected in series to the main electric motor 15. Therefore, when the fuel cell stack 2 stops outputting the electric energy, the auxiliary equipment can be kept by inertia at the rotational speed in synchronism with the main electric motor 15. As a result, the fuel cell stack 2 can subsequently start generating electric energy quickly for increased efficiency.

Figure 14:
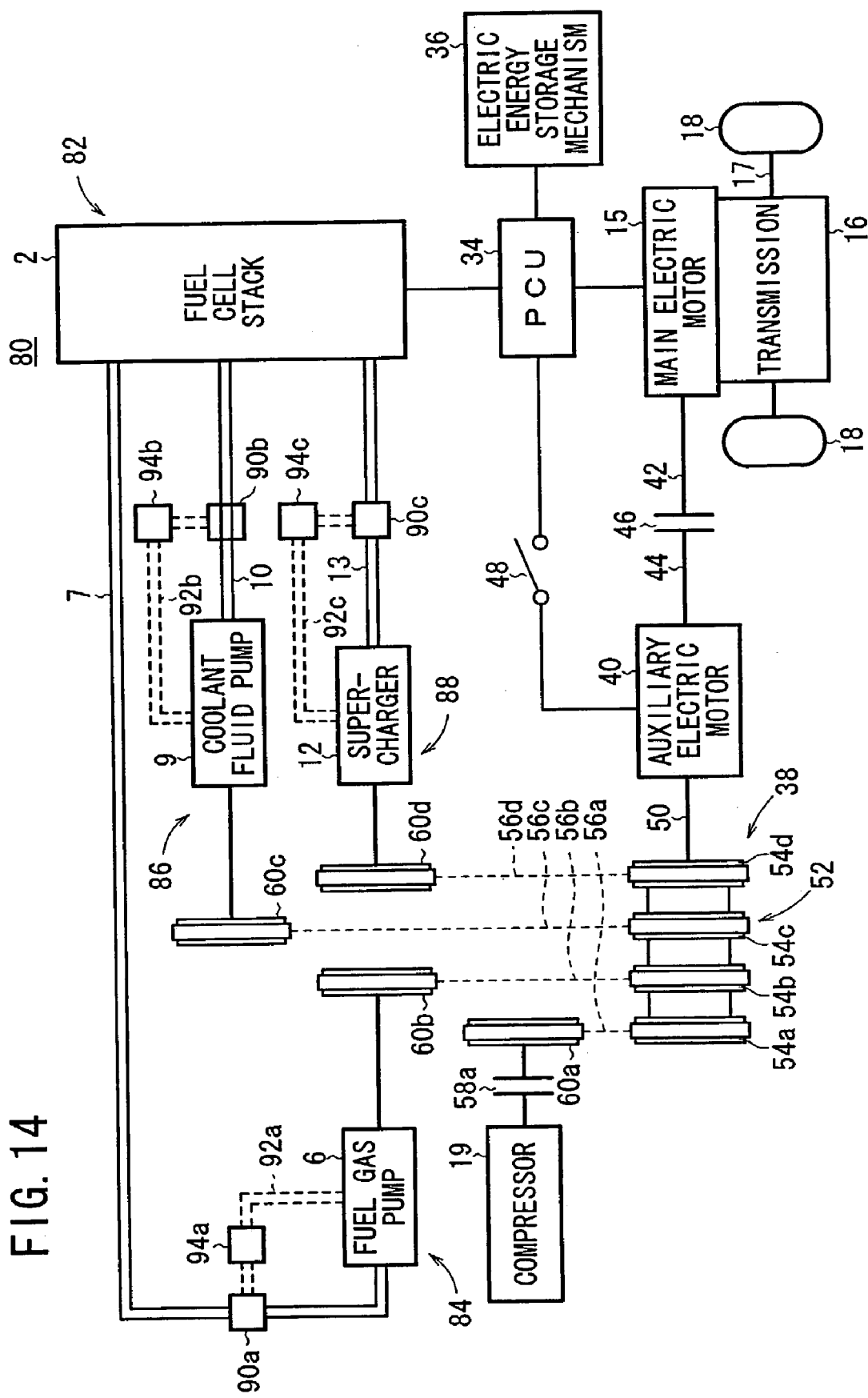
FIG. 14 is a schematic diagram of a vehicle with an electric motor mounted thereon according to a second embodiment of the present invention.

FIG. 14 schematically shows a vehicle 80 with an electric motor mounted thereon according to a second embodiment of the present invention. Those parts of the vehicle 80 which are identical to those of the vehicle 30 according to the first embodiment are denoted by identical reference characters, and will not be described in detail below. Similarly, those parts of vehicles according to other embodiments to be described later on which are identical to those of the vehicle 30 according to the first embodiment are also denoted by identical reference characters, and will not be described in detail below.

As shown in FIG. 14, the vehicle 80 incorporates a fuel cell system 82 having a fuel gas supply unit 84, a coolant fluid supply unit 86, and an oxygen-containing gas supply unit 88. The fuel gas supply unit 84 has a first bypass valve 90a mounted in the fuel gas supply passage 7 which communicates between a fuel gas outlet of the fuel gas pump 6 and a fuel gas inlet of the fuel cell stack 2.

The first bypass valve 90a has a function to connect the fuel gas outlet of the fuel gas pump 6 selectively to the fuel gas supply passage 7 leading to the fuel cell stack 2 and a first bypass passage 92a which communicates with a fuel gas inlet of the fuel gas pump 6. The first bypass passage 92a has a first restriction 94a for applying a resistance to the flow of the fuel gas in the first bypass passage 92a, the resistance being similar to the resistance applied to the flow of the fuel gas in the fuel cell stack 2.

The coolant fluid supply unit 86 and the oxygen-containing gas supply unit 88 have second and third bypass valves 90b, 90c, respectively, mounted in the coolant fluid supply passage 10 and the oxygen-containing gas supply passage 13, respectively. The second bypass valve 90b has a function to connect a coolant fluid outlet of the coolant fluid pump 9 selectively to the coolant fluid supply passage 10 leading to the fuel cell stack 2 and a second bypass passage 92b which communicates with a coolant fluid inlet of the coolant fluid pump 9.

The third valve 90c has a function to connect an oxygen-containing gas outlet of the supercharger 12 selectively to the oxygen-containing gas supply passage 13 leading to the fuel cell stack 2 and a third bypass passage 92c which communicates with an oxygen-containing gas inlet of the supercharger 12. The second and third bypass passages 92b, 92c have respective second and third restrictions 94b, 94c for applying a resistance to the flows of the coolant fluid and the oxygen-containing gas in the second and third bypass passages 92b, 92c, respectively.

According to the second embodiment, no clutch mechanisms are provided between the fuel gas pump 6, the coolant fluid pump 9, and the supercharger 12 and the pulleys 60b, 60c, 60d. To stop supplying the fuel gas, the coolant fluid, and the oxygen-containing gas to the fuel cell stack 2, the first through third bypass valves 90a, 90b, 90c are switched to circulate the fuel gas, the coolant fluid, and the oxygen-containing gas through the first through third bypass passages 92a, 92b, 92c.

Consequently, the fuel gas, the coolant fluid, and the oxygen-containing gas are prevented from being unduly introduced into the fuel cell stack 2. As the fuel gas pump 6, the coolant fluid pump 9, and the supercharger 12 rotate at predetermined rotational speeds, the fuel gas, the coolant fluid, and the oxygen-containing gas can quickly and reliably be supplied to the fuel cell stack 2 simply by switching the first through third bypass valves 90a, 90b, 90c.

Figure 15:
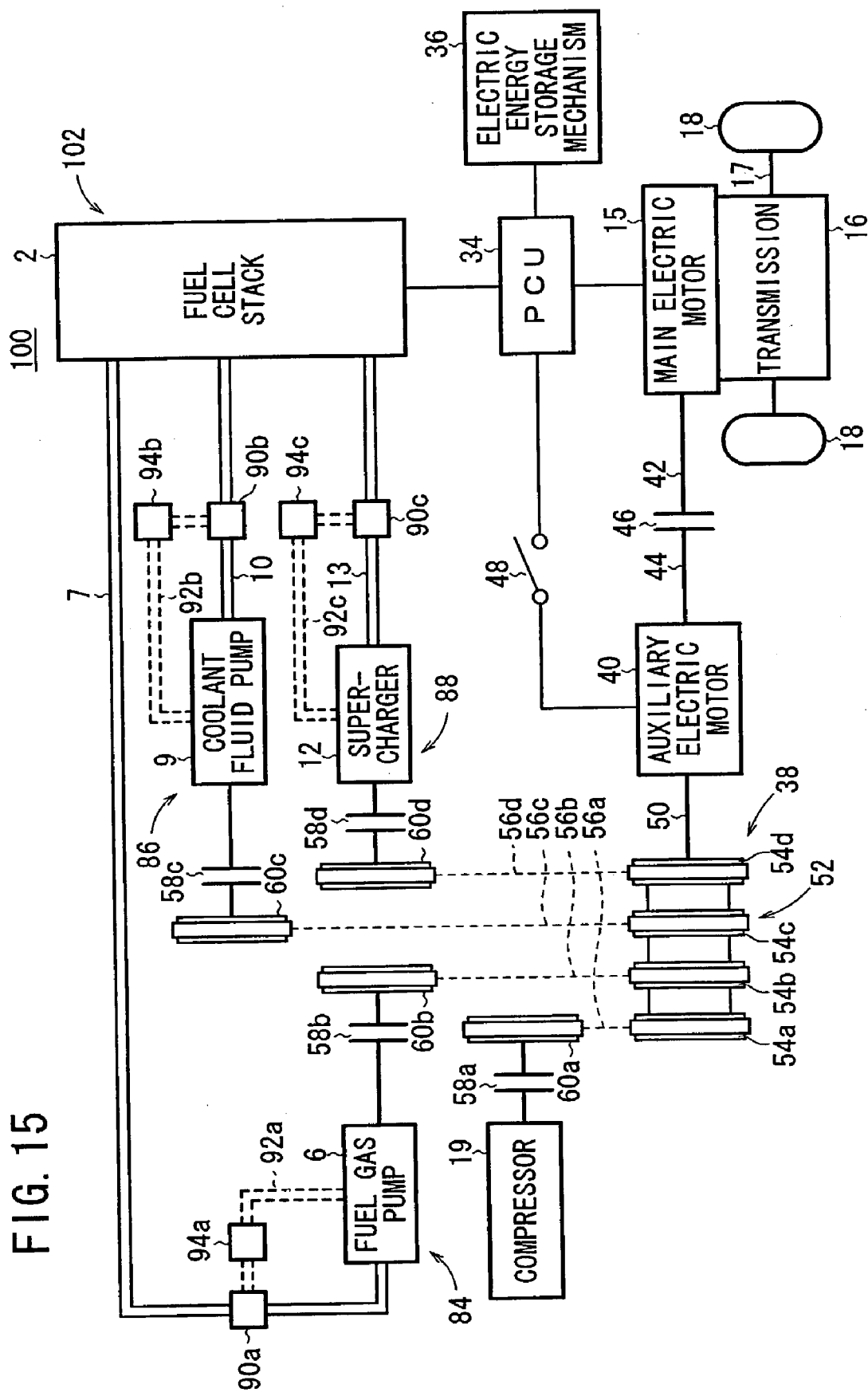
FIG. 15 is a schematic diagram of a vehicle with an electric motor mounted thereon according to a third embodiment of the present invention.

FIG. 15 schematically shows a vehicle 100 with an electric motor mounted thereon according to a third embodiment of the present invention.

As shown in FIG. 15, the vehicle 100 incorporates a fuel cell system 102 which is a combination of the fuel cell systems 32, 82 according to the first and second embodiments described above. The clutch mechanisms 58b, 58c, 58d and the first through third bypass valves 90a, 90b, 90c are controlled to allow the fuel cell system 102 to handle various operating states of the vehicle 100.

For example, for inactivating the fuel cell stack 2 for a relatively long time, the clutch mechanisms 58b, 58c, 58d are disengaged. For repeatedly activating and inactivating the fuel cell stack 2, the clutch mechanisms 58b, 58c, 58d are engaged, and the first through third bypass valves 90a, 90b, 90c are switched to circulate the fuel gas, the coolant fluid, and the oxygen-containing gas through the first through third bypass passages 92a, 92b, 92c.

Figure 16:
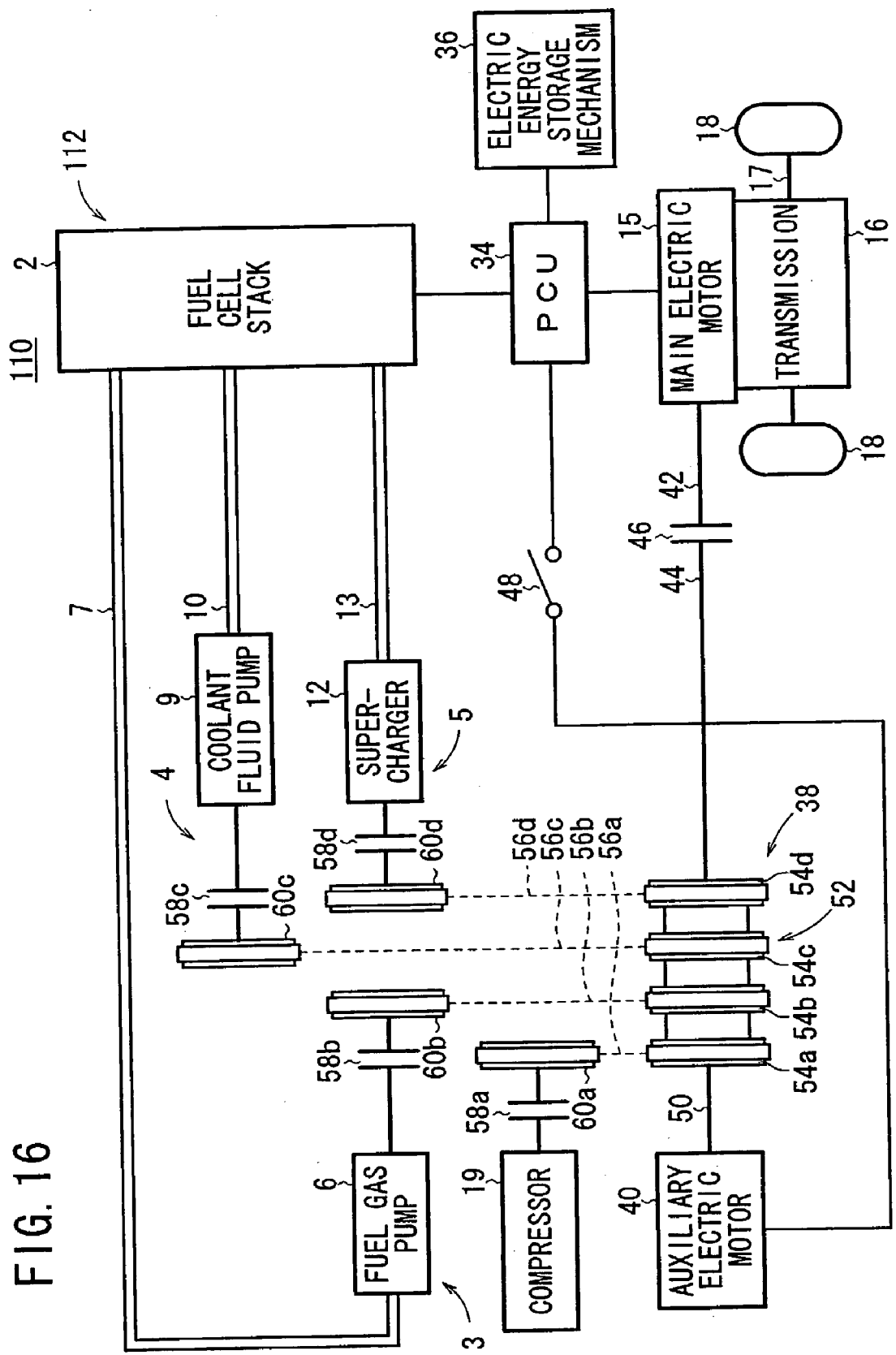
FIG. 16 is a schematic diagram of a vehicle with an electric motor mounted thereon according to a fourth embodiment of the present invention.

FIG. 16 schematically shows a vehicle 110 with an electric motor mounted thereon according to a fourth embodiment of the present invention.

As shown in FIG. 16, the vehicle 110 incorporates a fuel cell system 112 in which the clutch mechanism 46, the drive power transmitting mechanism 38, and the auxiliary electric motor 40 are connected in the order named in series to the drive shaft 42 of the main electric motor 15. The vehicle 110 according to the fourth embodiment thus offers the same advantages as the vehicle 30 according to the first embodiment.

Figure 17:
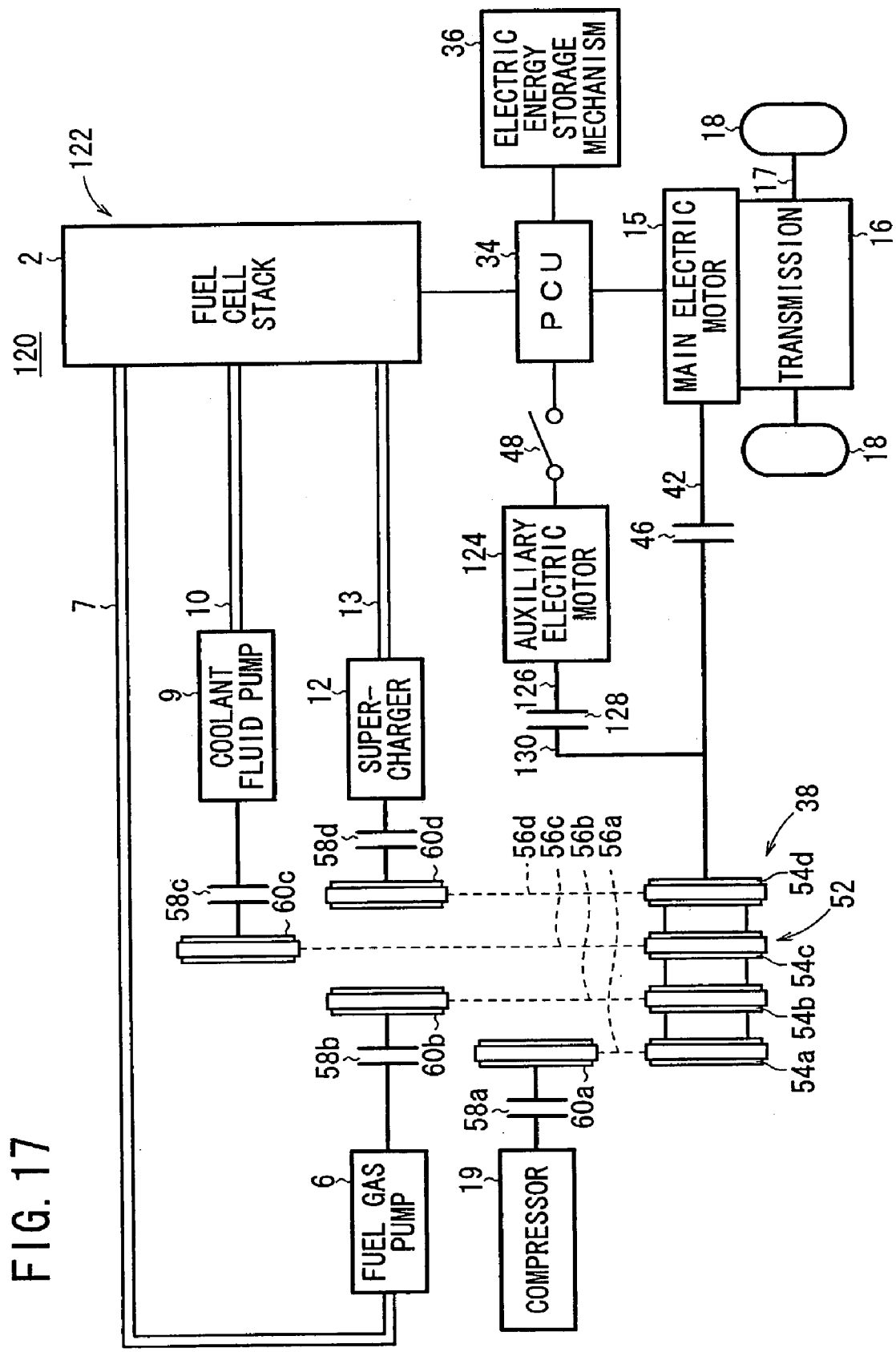
FIG. 17 is a schematic diagram of a vehicle with an electric motor mounted thereon according to a fifth embodiment of the present invention.

FIG. 17 schematically shows a vehicle 120 with an electric motor mounted thereon according to a fifth embodiment of the present invention.

As shown in FIG. 17, the vehicle 120 incorporates a fuel cell system 122 having an auxiliary electric motor 124 which can be connected parallel to the main electric motor 15. The auxiliary electric motor 124 has an output shaft 126 connected to a clutch mechanism 128 parallel to the clutch mechanism 46. The clutch mechanism 128 can connect the output shaft 126 to and disconnect the output shaft 126 from a coupling shaft 130 connected to the drive power transmitting mechanism 38.

In the fifth embodiment, the switch 48 may not be provided between the PCU 34 and the auxiliary electric motor 124.

With the vehicle 120 thus arranged, the main electric motor 15 and the auxiliary electric motor 124 are controlled selectively or in combination, substantially as with the vehicle 30 according to the first embodiment.

Figure 18:
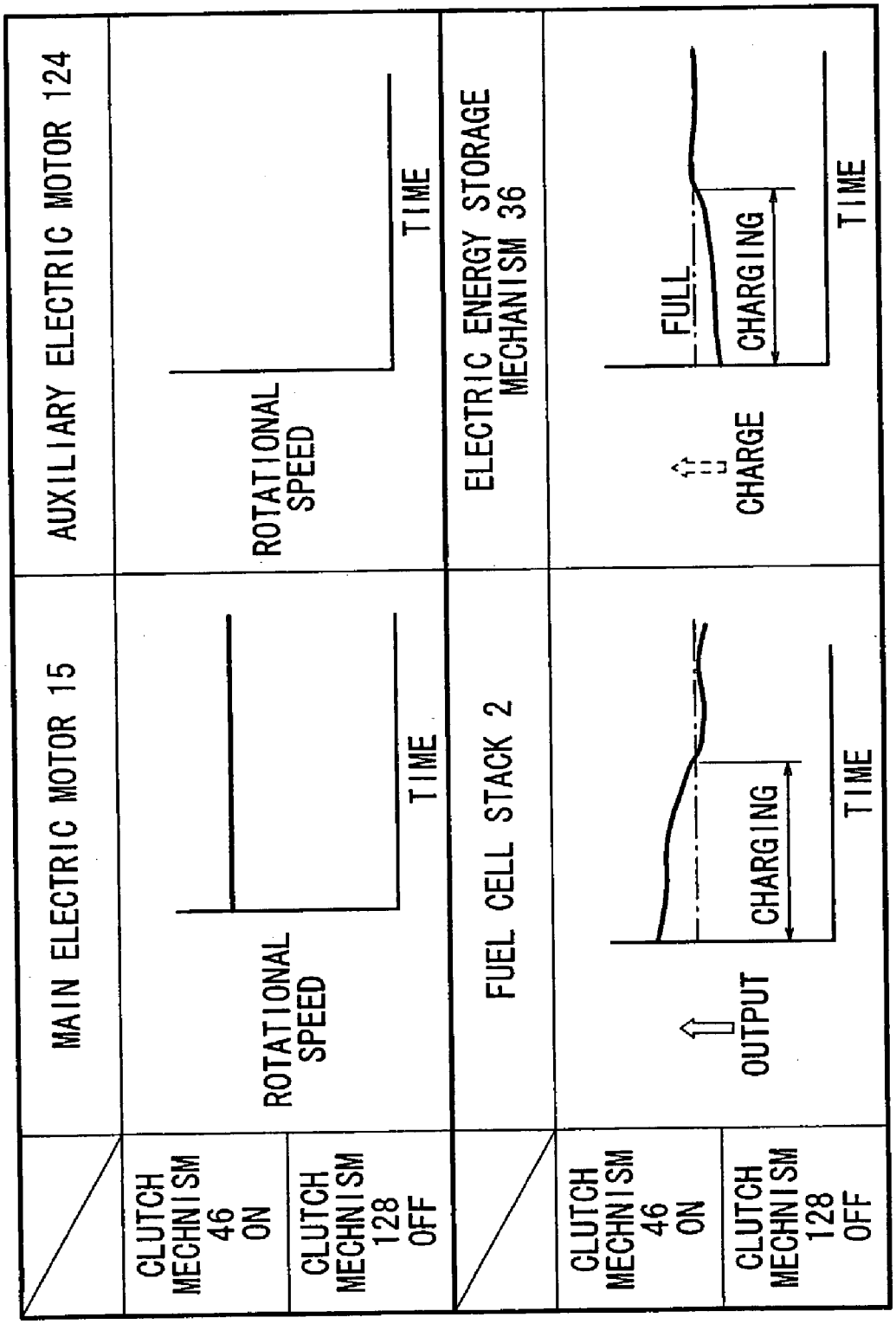
FIG. 18 is a schematic diagram of the vehicle shown in FIG. 17 when it is in a normal running mode.

Specifically, when the vehicle 120 operates in the normal running mode, as shown in FIG. 18, the clutch mechanism 46 is engaged, and the clutch mechanism 128 is disengaged. The auxiliary electric motor 124 is de-energized, and only the main electric motor 15 is energized to transmit the rotary power to the axles 17. The main electric motor 15 also applies drive power through the drive power transmitting mechanism 38 to the fuel gas pump 6, the coolant fluid pump 9, and the supercharger 12 which serve as auxiliary equipment to operate the fuel cell stack 2.

The drive power is also applied through the drive power transmitting mechanism 38 to the compressor 19 for operating the air-conditioning unit 72 if necessary.

Figure 19:
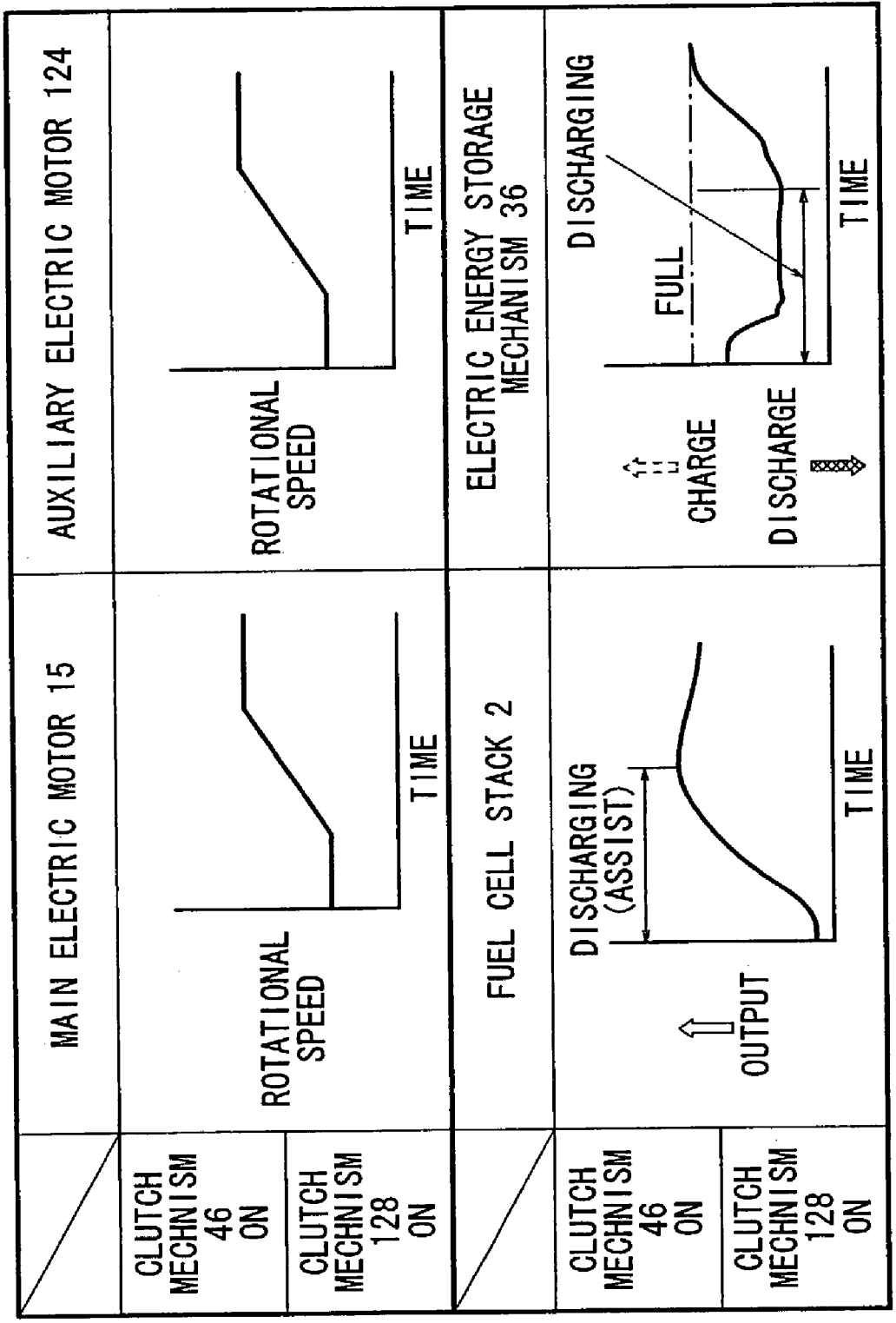
FIG. 19 is a schematic diagram of the vehicle shown in FIG. 17 when it is accelerated.

For accelerating the vehicle 120, as shown in FIG. 19, the clutch mechanisms 46, 128 are engaged. Therefore, the vehicle 120 is accelerated by the rotation of the main electric motor 15, assisted by the rotation of the auxiliary electric motor 124. If the electric energy outputted from fuel cell stack 2 is insufficient at this time, then the electric energy storage mechanism 36 supplies (discharges) assistive electric energy.

Figure 20:
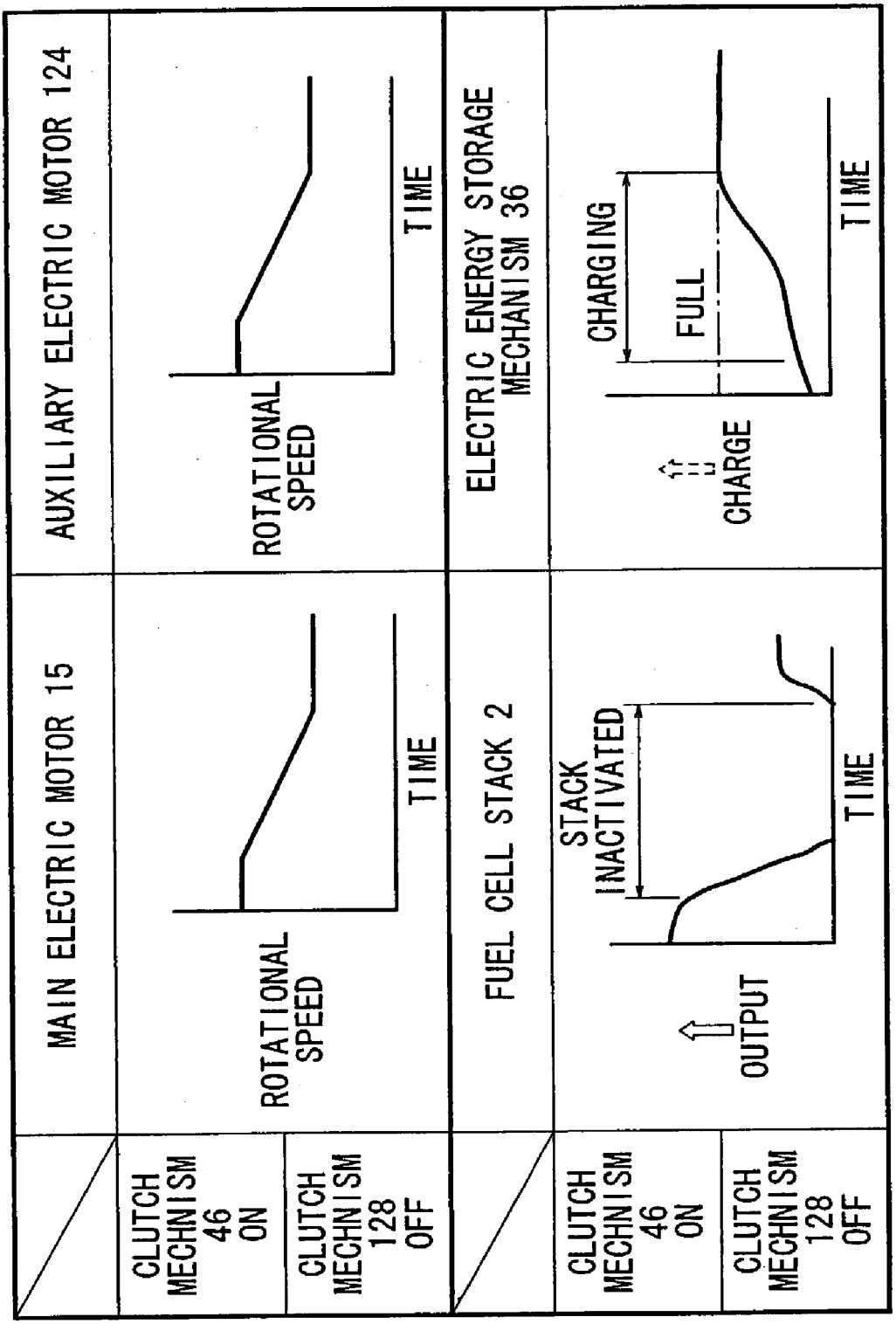
FIG. 20 is a schematic diagram of the vehicle shown in FIG. 17 when it is decelerated.

For decelerating the vehicle 120, as shown in FIG. 20, the clutch mechanism 46 is engaged, and the clutch mechanism 128 is disengaged. The regenerated electric energy produced by the main electric motor 15 is supplied to charge the electric energy storage mechanism 36, after which the clutch mechanism 128 is engaged. The extra regenerated electric energy energizes the auxiliary electric motor 124. The extra regenerated electric energy is thus used as an energy source for the auxiliary equipment, and prevents the operation of the engine brake developed by the main electric motor 15 from changing.

Figure 21:
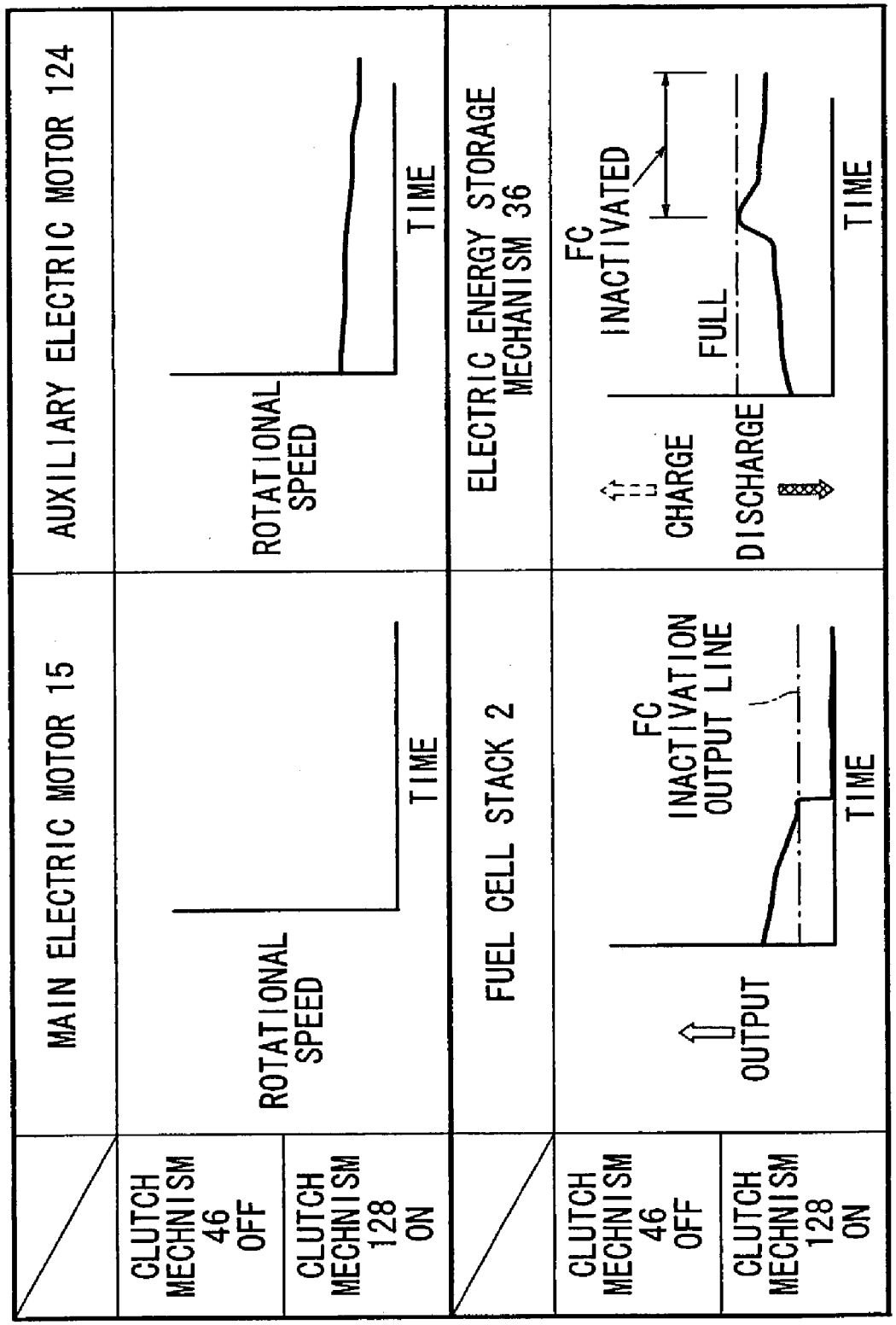
FIG. 21 is a schematic diagram of the vehicle shown in FIG. 17 when it is idling.

For stopping the vehicle 30 in the idling mode, as shown in FIG. 21, the clutch mechanism 46 is disengaged, and the clutch mechanism 128 is engaged. The fuel cell stack 2 outputs electric energy to the auxiliary electric motor 124 and loads such as electric lamps, etc. in the interior of the vehicle 30. The fuel cell stack 2 is repeatedly activated, operated to generate electric energy, and inactivated depending on the remaining electric energy in the electric energy storage mechanism 36. The fuel cell stack 2 can thus be operated in a good-efficiency range.

Figure 22:
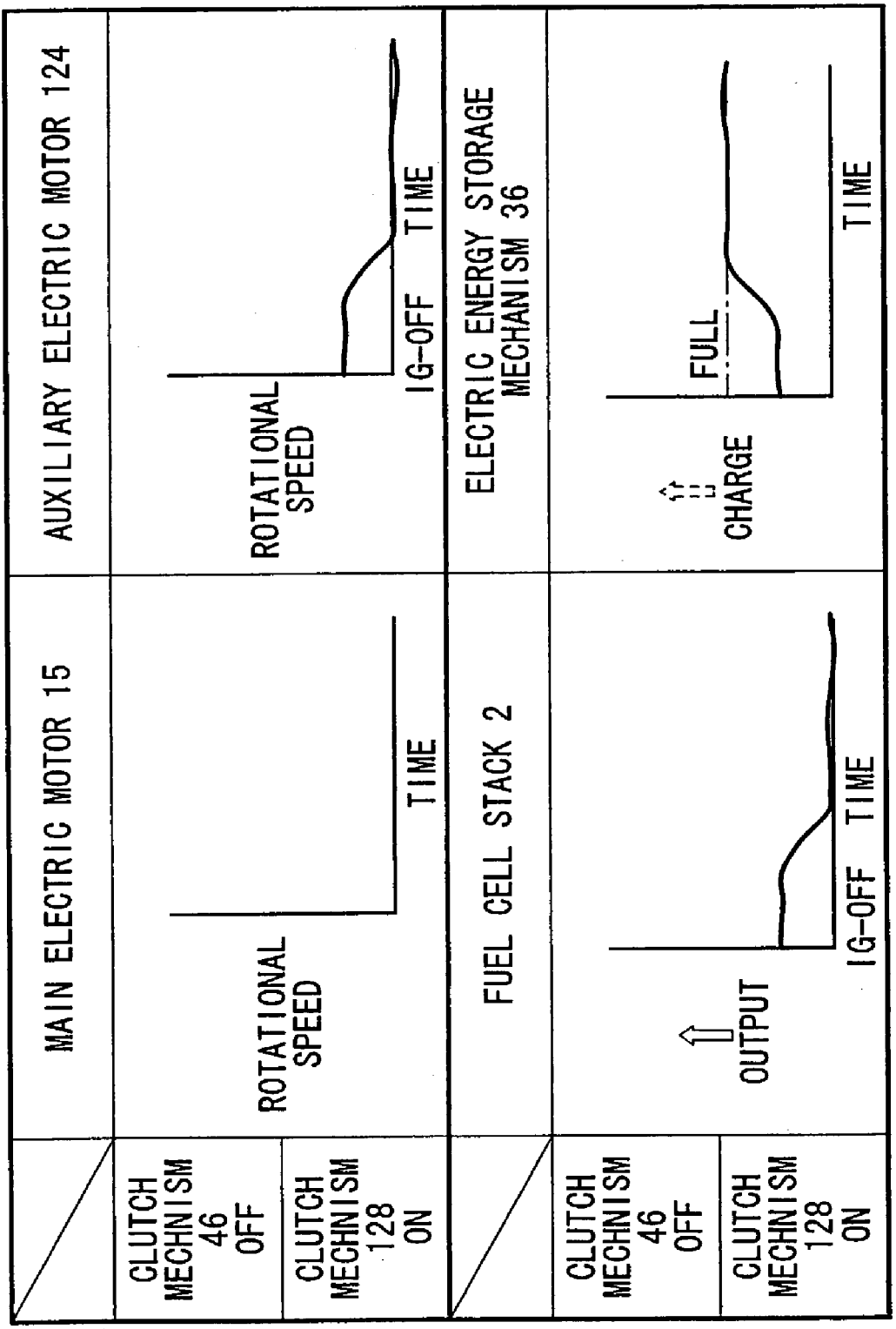
FIG. 22 is a schematic diagram of the vehicle shown in FIG. 17 when the ignition switch thereof is turned off.

When the ignition switch (not shown) of the vehicle 120 is turned off, as shown in FIG. 22, the auxiliary electric motor 124 is supplied with electric energy depending on the remaining electric energy in the electric energy storage mechanism 36, generating electric energy in the fuel cell stack 2. After the electric energy storage mechanism 36 is charged to a predetermined level, the fuel cell stack 2 is automatically inactivated.

Figure 23:
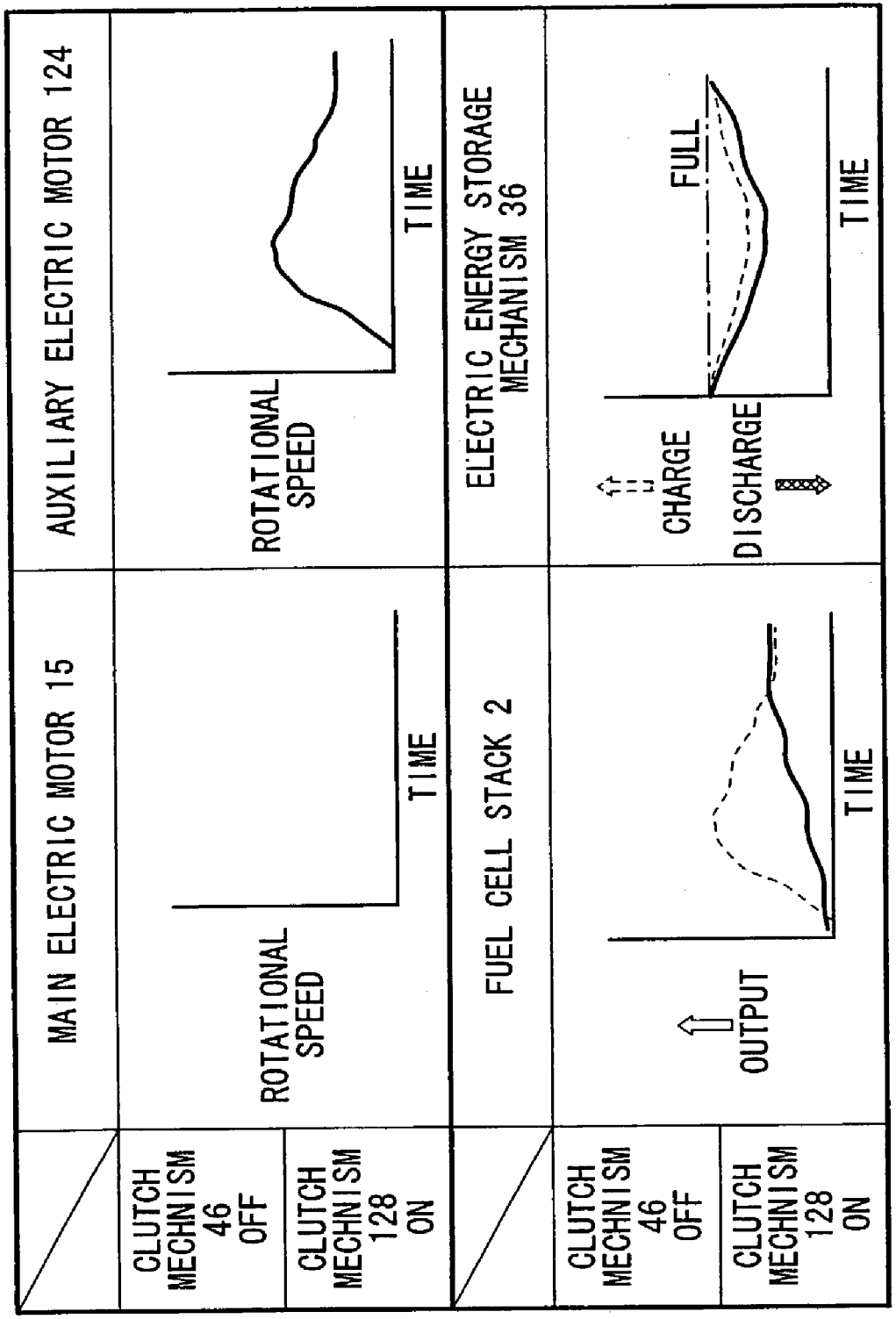
FIG. 23 is a diagram showing operational states of various components of the vehicle shown in FIG. 17 when it is started.

When the vehicle 120 is started, as shown in FIG. 23, the clutch mechanism 46 is disengaged, and the load on the fuel cell stack 2 is controlled depending on the manner in which the vehicle 120 is warmed up. If the vehicle 120 starts to run while the vehicle 120 is being warmed up, then the main electric motor 15 is energized with the clutch mechanism 46 disengaged. When the main electric motor 15 is synchronized with the auxiliary electric motor 124, the clutch mechanism 46 is engaged to operate the vehicle 120 in the normal running mode.

The vehicle 120 according to the fifth embodiment thus offers the same advantages as the vehicle 30 according to the first embodiment.

Figure 24:
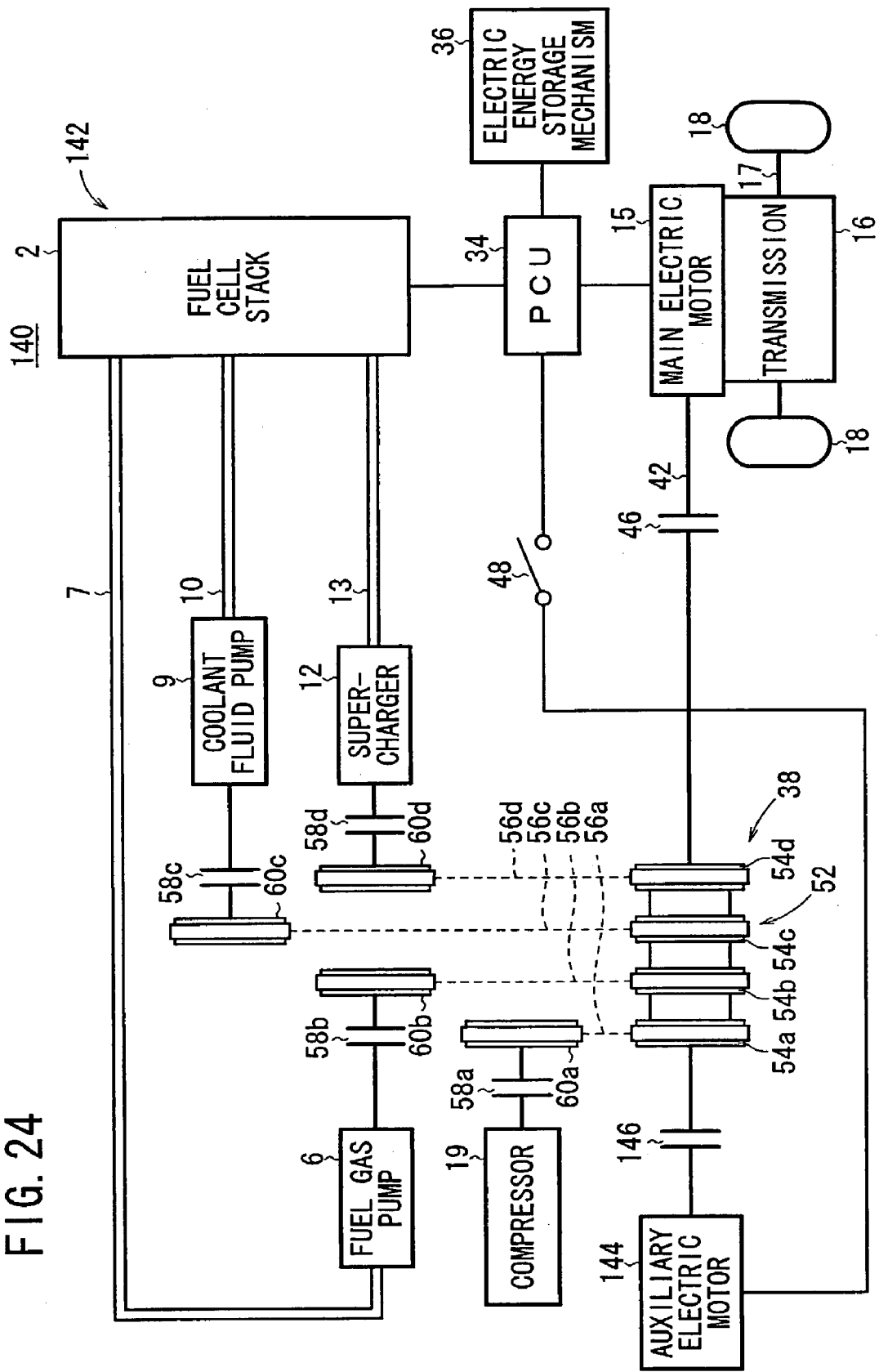
FIG. 24 is a schematic diagram of a vehicle with an electric motor mounted thereon according to a sixth embodiment of the present invention.

FIG. 24 schematically shows a vehicle 140 with an electric motor mounted thereon according to a sixth embodiment of the present invention.

As shown in FIG. 24, the vehicle 140 incorporates a fuel cell system 142 in which the main electric motor 15, the drive power transmitting mechanism 38, and the auxiliary electric motor 144 are connected to each other, and the drive power transmitting mechanism 38 and the auxiliary electric motor 144 can be connected to and disconnected from each other by clutch mechanisms 46, 146.

With the vehicle 140 thus arranged, the clutch mechanisms 46, 146 can be controlled to use the main electric motor 46 and the auxiliary electric motor 144 selectively or in combination depending on the manner in which the vehicle 140 is operated. The vehicle 140 according to the sixth embodiment thus operates in the same manner and offers the same advantages as the vehicle 120 according to the fifth embodiment.

In the first through sixth embodiments, the coolant fluid such as pure water, ethylene glycol, oil, or the like is supplied to the fuel cell stack 2 through the coolant fluid pump 9 in order to cool the fuel cell stack 2. The present invention is not limited to use of the coolant fluid such as pure water, ethylene glycol, oil, or the like, but is also applicable to use of air to cool the fuel cell stack 2.

In the vehicle with the electric motor mounted thereon according to the present invention, the main electric motor is assisted by the auxiliary electric motor, and the drive power for the auxiliary equipment incorporated in the vehicle is supplied selectively from either the main electric motor, or the auxiliary electric motor, or both the main electric motor and the auxiliary electric motor depending on the manner in which the vehicle is operated.

Therefore, the vehicle can be reduced in size and simplified in structure in its entirety, and the overall energy efficiency and power capabilities of the vehicle can effectively be increased. The vehicle can thus be kept reliably in a state for efficient operation.

Although certain preferred embodiments of the present invention have been shown and described in detail, it should be understood that various changes and modifications may be made therein without departing from the scope of the appended claims.

What is claimed is:

1. A vehicle which can be propelled by an electric motor mounted thereon, comprising:
    a drive power transmitting mechanism for engaging and disengaging a main electric motor and auxiliary equipment, and transmitting a drive power from said main electric motor to said auxiliary equipment; and
    an auxiliary electric motor connectable coaxially to said main electric motor for transmitting a drive power to said auxiliary equipment depending on the manner in which the vehicle is operated,
    wherein said drive power transmitting mechanism transmits a drive power to said auxiliary equipment from both said main electric motor and said auxiliary electric motor simultaneously, and
    said main electric motor and said auxiliary electric motor are connected to an input side of said drive power transmitting mechanism, while said auxiliary equipment is connected to an output side of said drive power transmitting mechanism.

2. A vehicle according to claim 1, further comprising:
    an electric energy supply mechanism for supplying electric energy to at least said main electric motor; and
    an electric energy storage mechanism for storing regenerated electric energy produced by said main electric motor and supplying the stored electric energy to at least either said main electric motor or said auxiliary electric motor when necessary.

3. A vehicle according to claim 2, wherein said electric energy supply mechanism comprises:
    a fuel cell stack having electrolyte electrode assemblies, each comprising a pair of electrodes and an electrolyte interposed between said electrodes, and separators which are alternately stacked;
    said auxiliary equipment comprising a reactant gas supply pump for supplying a reactant gas which is at least either a fuel gas or an oxygen-containing gas to said fuel cell stack.

4. A vehicle according to claim 3, further comprising:
    a reactant gas supply passage communicating between said reactant gas supply pump and said fuel cell stack;
    said reactant gas supply passage having a bypass passage connected to said reactant gas supply pump through a valve, said bypass passage having a restriction.

5. A vehicle according to claim 3, wherein said auxiliary equipment comprises a coolant fluid supply pump for supplying a coolant fluid to said fuel cell stack.

6. A vehicle according to claim 5, further comprising:
    a coolant fluid supply passage communicating between said coolant fluid supply pump and said fuel cell stack;
    said coolant fluid supply passage having a bypass passage connected to said coolant fluid supply pump through a valve, said bypass passage having a restriction.

7. A vehicle according to claim 2, further comprising a switch for electrically connecting at least said electric energy supply mechanism or said electric energy storage mechanism to said auxiliary electric motor.

8. A vehicle according to claim 1, further comprising:
    a clutch mechanism or a continuously variable transmission mechanism disposed between said main electric motor and said auxiliary electric motor.

9. A vehicle according to claim 1, further comprising:
    a clutch mechanism or a continuously variable transmission mechanism disposed between said main electric motor and said drive power transmitting mechanism;
    said drive power transmitting mechanism and said auxiliary electric motor being connected in series to each other.

10. A vehicle according to claim 9, further comprising:
    a clutch mechanism or a continuously variable transmission mechanism disposed between said drive power transmitting mechanism and said auxiliary electric motor.

11. A vehicle according to claim 1, wherein said main electric motor and said auxiliary electric motor are connected parallel to each other, further comprising:
    clutch mechanisms or continuously variable transmission mechanisms disposed respectively between said main electric motor and said drive power transmitting mechanism and between said auxiliary electric motor and said drive power transmitting mechanism.

12. A vehicle according to claim 1, wherein said drive power transmitting mechanism comprises:
    a first pulley connected to an output shaft of said auxiliary electric motor;
    a second pulley coupled to said auxiliary equipment; and
    a belt operatively connecting said first pulley and said second pulley to each other.

13. A vehicle according to claim 12, further comprising:
    a clutch mechanism disposed between said auxiliary equipment and said second pulley.

14. A vehicle which can be propelled by an electric motor mounted thereon, comprising:
    a drive power transmitting mechanism for engaging and disengaging a main electric motor and auxiliary equipment, and transmitting a drive power from said main electric motor to said auxiliary equipment, wherein said main electric motor is connected to an input side of said drive power transmitting mechanism and said auxiliary electric motor is connected to the same input side of said drive power transmitting mechanism; and an auxiliary electric motor connectable coaxially or parallel to said main electric motor for transmitting a drive power to said auxiliary equipment depending on the manner in which the vehicle is operated, wherein said drive power transmitting mechanism transmits a drive power to said auxiliary equipment from both said main electric motor and said auxiliary electric motor and said auxiliary equipment is connected to an output side of said drive power transmitting mechanism.

15. A vehicle which can be propelled by an electric motor mounted thereon, comprising:

a drive power transmitting mechanism for engaging and disengaging a main electric motor and auxiliary equipment, and transmitting a drive power from said main electric motor to said auxiliary equipment; and an auxiliary electric motor connectable coaxially to said main electric motor for transmitting a drive power to said auxiliary equipment depending on the manner in which the vehicle is operated, wherein said drive power transmitting mechanism transmits a drive power to said auxiliary equipment from both said main electric motor and said auxiliary electric motor, and said main electric motor and said auxiliary electric motor share a single output shaft that is connected to an input side of said drive power transmitting mechanism, while said auxiliary equipment is connected to an output side of said drive power transmitting mechanism.

* * * * *